(12) United States Patent
Zhou et al.

(10) Patent No.: US 11,351,458 B2
(45) Date of Patent: Jun. 7, 2022

(54) METHOD FOR CONTROLLING TARGET OBJECT, APPARATUS, DEVICE, AND STORAGE MEDIUM

(71) Applicant: TENCENT TECHNOLOGY (SHENZHEN) COMPANY LIMITED, Shenzhen (CN)

(72) Inventors: Fangyun Zhou, Shenzhen (CN); Yunfu Fang, Shenzhen (CN); Chengjun Zhan, Shenzhen (CN); Qian Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/191,056

(22) Filed: Mar. 3, 2021

(65) Prior Publication Data

US 2021/0187394 A1 Jun. 24, 2021

Related U.S. Application Data

(63) Continuation of application No. PCT/JP2019/120741, filed on Nov. 25, 2019.

(30) Foreign Application Priority Data

Nov. 28, 2018 (CN) .......................... 201811448777.9

(51) Int. Cl.
*A63F 13/57* (2014.01)
*A63F 13/35* (2014.01)
*G06N 20/00* (2019.01)

(52) U.S. Cl.
CPC .............. *A63F 13/57* (2014.09); *A63F 13/35* (2014.09); *G06N 20/00* (2019.01)

(58) Field of Classification Search
CPC .......... A63F 13/57; A63F 13/55; G06N 20/00
See application file for complete search history.

(56) References Cited

U.S. PATENT DOCUMENTS 7,584,082 B2 * 9/2009 Orofino, II .............. G06F 30/20
703/6
7,953,521 B2 * 5/2011 Tipping ................... G09B 9/04
701/1

(Continued)

FOREIGN PATENT DOCUMENTS

CN 108057249 A 5/2018
CN 108197705 A 6/2018

(Continued)

OTHER PUBLICATIONS

The European Patent Office (EPO) the Extended European Search Report for 19888588.1 dated Dec. 15, 2021 11 Pages.

(Continued)

*Primary Examiner* — David L Lewis
*Assistant Examiner* — Matthew D Hoel
(74) *Attorney, Agent, or Firm* — Anova Law Group, PLLC

(57) ABSTRACT

Embodiments of this application disclose a method for controlling a target object. The method includes receiving an object control instruction, and obtaining interaction frame data from a target application according to the object control instruction, the object control instruction carrying an identifier of a target object; obtaining to-be-processed data corresponding to the interaction frame data through an object control model; processing the to-be-processed data using a data processing framework to obtain an interaction control instruction, the interaction control instruction carrying the identifier of the target object, the data processing framework implementing sparse convolutional processing of data; and transmitting the interaction control instruction (Continued)

through the target application, the interaction control instruction instructing at least one terminal device to control the target object in the target application.

20 Claims, 13 Drawing Sheets

(56) References Cited

U.S. PATENT DOCUMENTS

| | | | | |
|---|---|---|---|---|
| 8,005,066 | B2* | 8/2011 | Uri | H04L 67/38 |
| | | | | 370/351 |
| 8,016,664 | B2* | 9/2011 | Thomas | A63F 13/00 |
| | | | | 463/23 |
| 8,069,124 | B2* | 11/2011 | Putzolu | A63F 13/67 |
| | | | | 706/10 |
| 8,142,268 | B2* | 3/2012 | Thomas | A63F 13/79 |
| | | | | 463/6 |
| 8,280,826 | B2* | 10/2012 | Putzolu | A63F 13/67 |
| | | | | 706/10 |
| 8,366,526 | B2* | 2/2013 | Baynes | A63F 13/69 |
| | | | | 463/6 |
| 8,678,894 | B2* | 3/2014 | Thomas | G06F 3/0481 |
| | | | | 463/6 |
| 8,684,819 | B2* | 4/2014 | Thomas | A63F 13/67 |
| | | | | 463/23 |
| 8,827,785 | B2* | 9/2014 | Suzuki | A63F 13/12 |
| | | | | 463/4 |
| 9,132,839 | B1* | 9/2015 | Tan | B60W 50/00 |
| 9,248,819 | B1* | 2/2016 | Tan | B60T 17/18 |
| 10,096,134 | B2* | 10/2018 | Yan | G06N 3/063 |
| 10,471,357 | B2* | 11/2019 | Thomas | A63F 13/42 |
| 10,528,864 | B2* | 1/2020 | Dally | G06N 3/0454 |
| 10,860,922 | B2* | 12/2020 | Dally | G06F 7/5443 |
| 10,891,538 | B2* | 1/2021 | Dally | G06F 9/3001 |
| 10,997,496 | B2* | 5/2021 | Dally | G06F 7/5443 |
| 11,061,402 | B2* | 7/2021 | Urtasun | G01S 17/89 |
| 11,176,439 | B2* | 11/2021 | Chen | G06N 3/0454 |
| 11,188,744 | B2* | 11/2021 | Chen | G06F 17/15 |
| 2004/0266526 | A1 | 12/2004 | Herbrich et al. | |
| 2006/0246972 | A1 | 11/2006 | Thomas et al. | |
| 2018/0137417 | A1 | 5/2018 | Theodorakopoulos et al. | |
| 2018/0256981 | A1 | 9/2018 | Enomoto | |
| 2018/0300600 | A1 | 10/2018 | Ma et al. | |

FOREIGN PATENT DOCUMENTS

| | | |
|---|---|---|
| CN | 108229360 A | 6/2018 |
| CN | 108283809 A | 7/2018 |
| CN | 108537331 A | 9/2018 |
| CN | 108734272 A | 11/2018 |
| CN | 108805276 A | 11/2018 |
| CN | 108888958 A | 11/2018 |
| CN | 109550249 A | 4/2019 |

OTHER PUBLICATIONS

Paul Bertens et al., "A machine-Learning Item Recommendation System for Video Games," arxiv.org, arXiv:1806.04900v1, Jun. 13, 2018 (Jun. 13, 2018). 4 pages.

The State Intellectual Property Office of the People's Republic of China (SIPO) Office Action 1 for for 201811448777.9 dated Aug. 4, 2021 16 Pages (including translation).

The World Intellectual Property Organization (WIPO) International Search Report for PCT/CN2019/120741 dated Feb. 18, 2020 5 Pages (including translation).

* cited by examiner

US 11,351,458 B2

METHOD FOR CONTROLLING TARGET OBJECT, APPARATUS, DEVICE, AND STORAGE MEDIUM

RELATED APPLICATIONS

This application claims priority to PCT Application No. PCT/CN2019/120741, filed on Nov. 25, 2019, which in turn claims priority to Chinese Patent Application No. 201811448777.9, entitled "METHOD FOR CONTROLLING TARGET OBJECT AND RELATED APPARATUS" and filed with the Chinese Patent Office, Nov. 28, 2018. The two applications are incorporated by reference in their entirety.

FIELD OF THE TECHNOLOGY

This application relates to the field of artificial intelligence (AI), and in particular, relates to a method for controlling a target object, an apparatus, a device, and a storage medium.

BACKGROUND OF THE DISCLOSURE

The online game industry is an emerging industry. With the rapid development in recent years, the online game industry has rapidly entered a maturing stage. Multiplayer online battle arena (MOBA) games are an important part of online games.

MOBA games usually involve interactions among multiple players. Therefore, when a player is disconnected or another exception occurs in one round of game, a team that the player is in may lose the round of game because it has fewer players. In this case, a server performs training by using a general framework like Caffe or TensorFlow to obtain an Artificial Intelligence ("AI") model, and a terminal device can then predict the operations of the player by combining an AI model and data of the entire round of game in the general framework.

However, frameworks like Caffe or TensorFlow are high-order machine learning frameworks. When this type of general framework is used to predict the operations of a player, a lot of internal memory usually needs to be occupied. A terminal device often has a relatively low computing capability and has a relatively small amount of storage resources. Therefore, when this type of general framework is deployed on a terminal device, the performance of the terminal device is severely impaired.

SUMMARY

Embodiments of this application provide a method for controlling a target object, an apparatus, a device, and a storage medium. A terminal device may predict the operations of a player by using a data processing framework. The data processing framework may implement sparse convolutional processing of data. Therefore, the amount of data processing is greatly reduced, the consumption of internal memory is effectively reduced, and the operating speed is increased at the same time, so that the performance of the terminal device can be significantly increased.

One aspect of this application discloses a method for controlling a target object. The method includes receiving an object control instruction, and obtaining interaction frame data from a target application according to the object control instruction, the object control instruction carrying an identifier of a target object; obtaining to-be-processed data corresponding to the interaction frame data through an object control model; processing the to-be-processed data using a data processing framework to obtain an interaction control instruction, the interaction control instruction carrying the identifier of the target object, the data processing framework implementing sparse convolutional processing of data; and transmitting the interaction control instruction through the target application, the interaction control instruction instructing at least one terminal device to control the target object in the target application.

A second aspect of this application provides an object control apparatus. The object control apparatus includes an obtaining module, configured to: receive an object control instruction transmitted, and obtain interaction frame data from a target application according to the object control instruction, the object control instruction carrying an identifier of a target object; the obtaining module being further configured to obtain to-be-processed data corresponding to the interaction frame data using an object control model; a processing module, configured to process, using a data processing framework, the to-be-processed data obtained by the obtaining module to obtain an interaction control instruction, the interaction control instruction carrying the identifier of the target object, the data processing framework implementing sparse convolutional processing of data; and a transmission module, configured to transmit, to the server using the target application, the interaction control instruction obtained through processing by the processing module, the interaction control instruction instructing at least one terminal device to control the target object in the target application.

A third aspect of this application provides a terminal device. The terminal device includes a memory, a transceiver, a processor, and a bus system. The memory being configured to store a program; and the processor being configured to execute the program in the memory to perform the following operations: receiving an object control instruction transmitted, and obtaining interaction frame data from a target application according to the object control instruction, the object control instruction carrying an identifier of a target object; obtaining to-be-processed data corresponding to the interaction frame data through an object control model; processing the to-be-processed data using a data processing framework to obtain an interaction control instruction, the interaction control instruction carrying the identifier of the target object, the data processing framework implementing sparse convolutional processing of data; and transmitting the interaction control instruction using the target application, the interaction control instruction instructing at least one terminal device to control the target object in the target application; and the bus system being configured to connect the memory and the processor to enable the memory and the processor to perform communication.

A fourth aspect of this application provides a non-transitory computer-readable storage medium, the computer-readable storage medium storing a program, the program, when run on a processor, causing the processor to perform: receiving an object control instruction, and obtaining interaction frame data from a target application according to the object control instruction, the object control instruction carrying an identifier of a target object; obtaining to-be-processed data corresponding to the interaction frame data through an object control model; processing the to-be-processed data using a data processing framework to obtain an interaction control instruction, the interaction control instruction carrying the identifier of the target object, the data processing framework implementing sparse convolutional processing of data; and transmitting the interaction control instruction through the target application, the interaction control instruction instructing at least one terminal device to control the target object in the target application.

In some embodiments of this application, the terminal device may predict the operations of an idle or disconnected player by using a data processing framework. The data processing framework may implement sparse convolutional processing of data. In embodiments of the present application, the amount of data processing is greatly reduced, the consumption of internal memory is reduced, and the operating speed is increased at the same time, so that the performance of the terminal device is improved.

DESCRIPTION OF EMBODIMENTS

Figure 1:
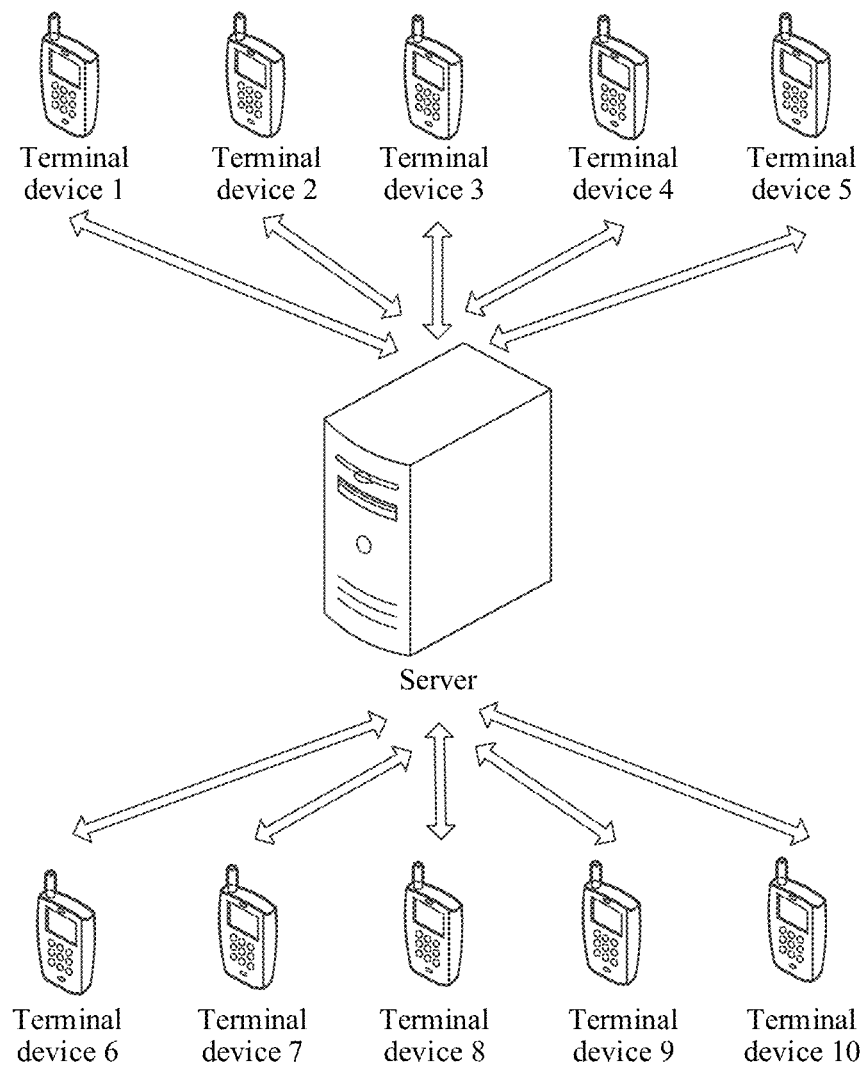
FIG. 1 is a schematic diagram of a system for controlling a target object according to an embodiment of this application.

Embodiments of this application provide a method for controlling a target object and a related apparatus. A terminal device may predict the operations of a player by using a data processing framework. The data processing framework may implement sparse convolutional processing of data. Therefore, the amount of data processing is greatly reduced, the consumption of internal memory is effectively reduced, and the operating speed is increased at the same time, so that the performance of the terminal device can be significantly increased.

In the specification, claims, and accompanying drawings of this application, the terms "first", "second", "third", "fourth", and the like (if existing) are intended to distinguish between similar objects rather than describe a specific sequence or a precedence order. Data used in this way is exchangeable in a proper case, so that the embodiments of the present disclosure described herein can be implemented in an order different from the order shown or described herein. Moreover, the terms "include", "contain" and any other variants mean to cover the non-exclusive inclusion, for example, a process, method, system, product, or device that includes a list of steps or units is not necessarily limited to those steps or units that are expressly listed, but may include other steps or units not expressly listed or inherent to such a process, method, system, product, or device.

AI encompasses a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

AI technology is a comprehensive discipline, and relates to a wide range of fields including a hardware-level technology and a software-level technology. The basic AI technology generally includes technologies such as sensor technology, AI chip technology, cloud computing technology, distributed storage technology, a big data processing technology, an operating/interaction system, and electromechanical integration. AI software technologies mainly include several major directions such as a computer vision technology, an audio processing technology, a natural language processing technology, and machine learning/deep learning.

Machine Learning ("ML") is a multi-disciplinary subject involving a plurality of disciplines such as probability theory, statistics, approximation theory, convex analysis, and algorithm complexity theory. Machine learning specializes in studying how a computer simulates or implements a human learning behavior to obtain new knowledge or skills, and reorganize an existing knowledge structure, to keep improving its performance. Machine learning is a core of the AI, is a basic way to make the computer intelligent, and is applied to various fields of the AI. Machine learning and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as smart homes, smart wearable devices, virtual assistants, smart speakers, smart marketing, self-driving cars, autonomous vehicles, unmanned aerial vehicles, robots, smart medical care, and smart customer service. With the development of technologies, the AI technology will be applied in more fields, and play an increasingly important role.

The solutions provided in the embodiments of this application involve technologies such as machine learning of AI, and are specifically described by using the following embodiments.

The method for controlling a target object provided in this application may be applicable to a MOBA game. The MOBA game is a battle game in which multiple players are on line at the same time. For example, League of Legends, Honor of Kings, PlayerUnknown's Battlegrounds, and the like are all MOBA games. During a battle of a MOBA game on a terminal device, a player is often disconnected or idling. To avoid the impact on the experience of other users, an AI technology needs to be used to temporarily host a disconnected player. FIG. 1 is a schematic architectural diagram of a system for controlling a target object according to an embodiment of this application. As shown in the figure, a MOBA game is used as an example. It is assumed that a team A and a team B join a battle. The team A has five players, and the team B also has five players. Every player uses one terminal device, that is, the team A corresponds to a terminal device 1, a terminal device 2, a terminal device 3, a terminal device 4, and a terminal device 5. The team B corresponds to a terminal device 6, a terminal device 7, a terminal device 8, a terminal device 9, and a terminal device 10. When a player is disconnected or idling in the MOBA game, a server may select one or more terminal devices having relatively adequate system capacity, and the terminal device predicts the operations of the disconnected player online. For example, the terminal device 1 is disconnected. The server first selects the terminal device 6 having the best performance. The terminal device 6 then predicts the operations of the player in the terminal device 1, and after prediction, feeds back an operation instruction to the MOBA game. The MOBA game uploads the operation instruction to the server. Finally, the server feeds back the simulated operation instruction to the terminal devices, so that the operations of the disconnected player can be simulated in the MOBA game on these terminal devices.

Figure 2:
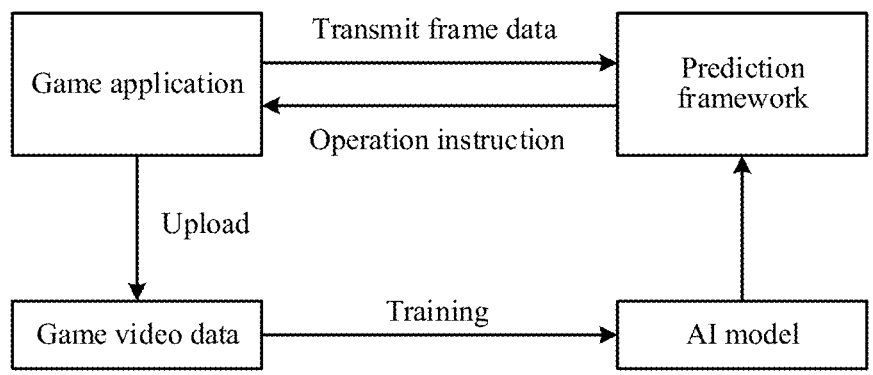
FIG. 2 is a schematic diagram of operations of a system for controlling a target object according to an embodiment of this application.

FIG. 2 is a schematic diagram of operations of a system for controlling a target object according to an embodiment of this application. As shown in the figure, a MOBA game uploads game video data to a server. The server trains an AI model by using a machine learning framework such as Caffe or TensorFlow. The AI model is usually obtained through offline training. During the prediction of the operations of a player, a prediction framework suitable for operating the MOBA game is designed and developed in this application. The prediction framework has the advantages such as a small code volume, a fast operating speed, and low storage consumption. The MOBA game transmits frame data of the game to the prediction framework. The prediction framework generates an operation instruction according to the frame data and the AI model, and then feeds back the operation instruction to the MOBA game.

Figure 3:
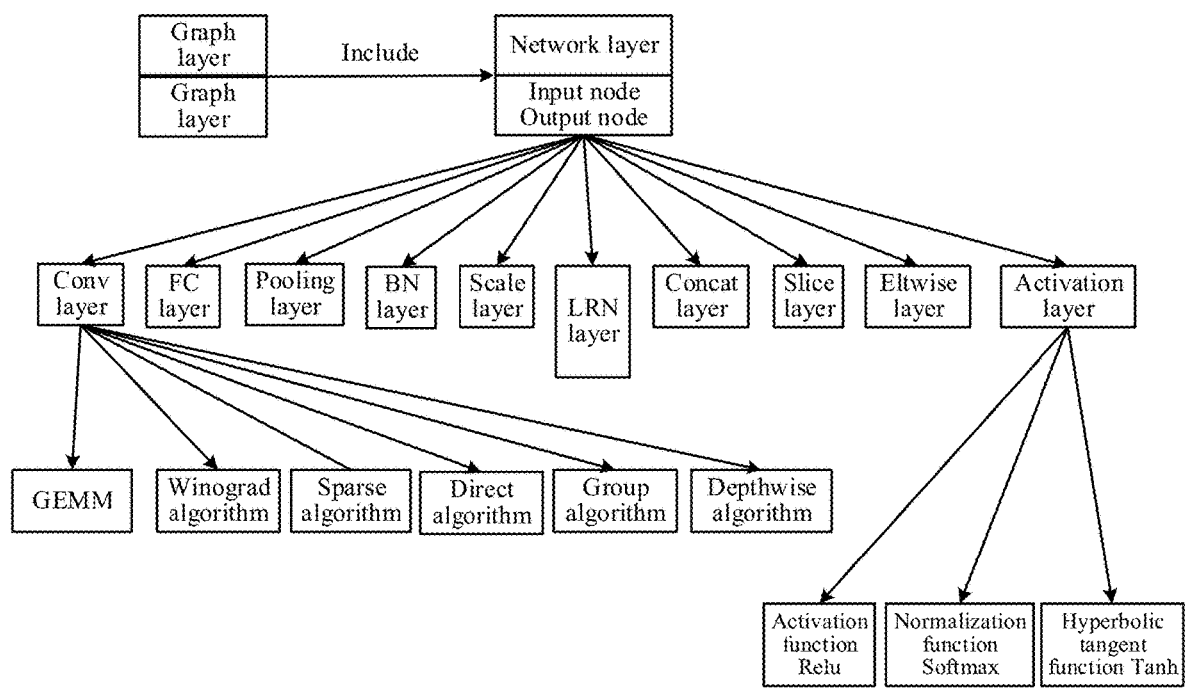
FIG. 3 is a schematic structural diagram of a data processing framework according to an embodiment of this application.

The prediction framework mentioned based on the foregoing is a data processing framework provided in this application. The data processing framework has a simple and clear design and only uses essential layers included in an AI model corresponding to a MOBA game on a terminal device. A graph structure is used for network description, and a graph includes various network layers. FIG. 3 is a schematic structural diagram of a data processing framework according to an embodiment of this application. A graph layer includes an input node and an output node. A base class of the network layer uses the form of an adjacency list to describe the directed graph of a network. A child class of the base class represents the network layer. The network layer may specifically include a conv layer, an FC layer, a pooling layer, a batch normalization (BN) layer, a scale layer, a local response normalization (LRN) layer, a concatenation (concat) layer, a slice layer, an element-wise (eltwise) layer, and an activation layer. A child class of a specific network layer (for example, the conv layer and the activation layer) is selected in a different computation manner of the network layer. For example, the conv layer has a general matrix to a general matrix multiply (GEMM) algorithm, a Winograd algorithm, a sparse algorithm, a direct algorithm, a group algorithm, a depthwise algorithm, and the like. The activation layer has an activation function (rectified linear and leaky, ReLU) algorithm, a normalization (softmax) algorithm, and a hyperbolic tangent (tanh) function.

Figure 4:
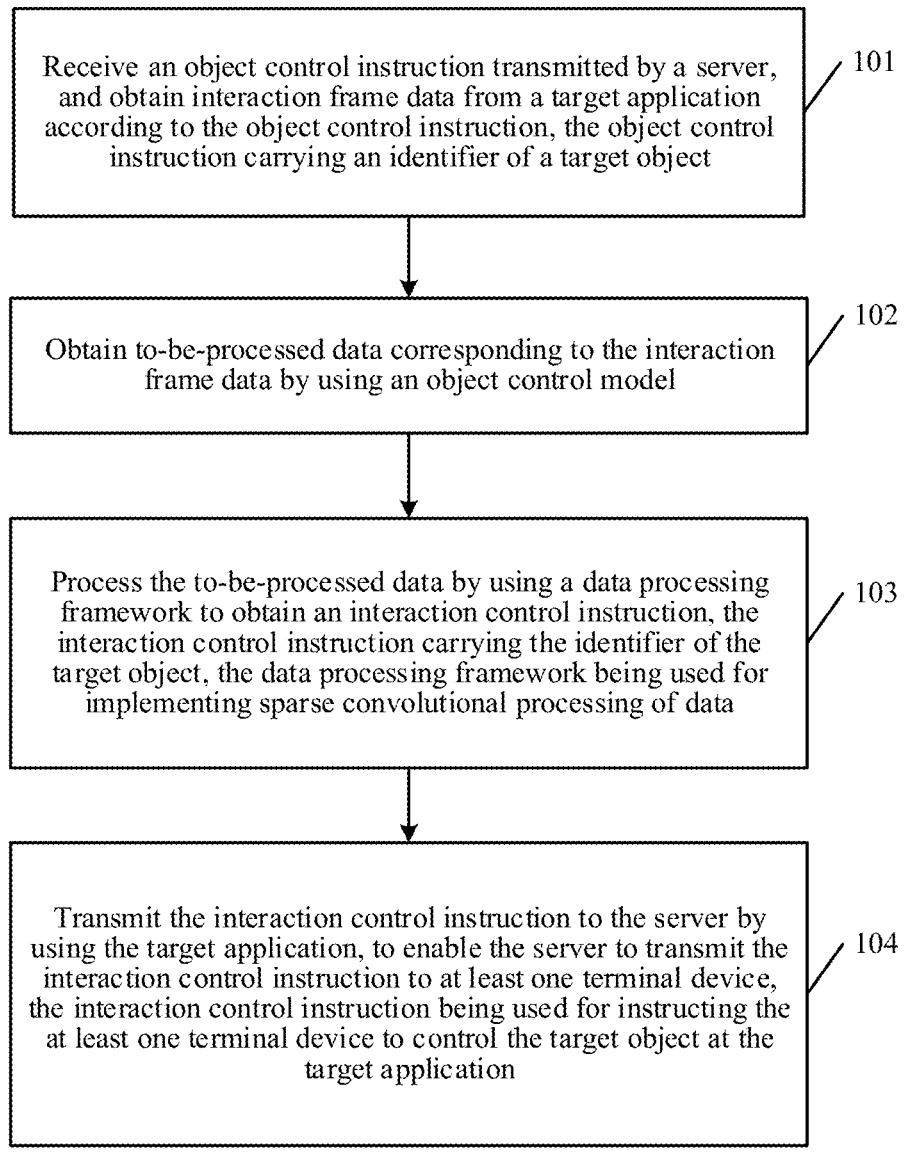
FIG. 4 is a schematic diagram of an embodiment of a method for controlling a target object according to an embodiment of this application.

The method for controlling a target object provided in this application is described below in combination with the foregoing description of the framework. The steps of the method may be performed by a terminal device, for example, an electronic device such as a mobile phone, a tablet computer, a personal computer (PC), a game console or the like. Referring to FIG. 4, an embodiment of the method for controlling a target object in this embodiment includes the following steps:

101: Receive an object control instruction transmitted by a server, and obtain interaction frame data from a target application according to the object control instruction, the object control instruction carrying an identifier of a target object.

In this embodiment, when a target application detects that a target object controlled by a player is still or a network message cannot be received and transmitted within a period of time, a target application server selects a terminal device with relatively adequate system capacity in a current round of game and starts an AI thread of the terminal device to simulate the target object as if it is controlled by the disconnected player. The chosen target terminal device receives an object control instruction transmitted by the target application server, the object control instruction carrying an identifier of the target object, so that the object that needs to be simulated may be determined according to the object control instruction. Accordingly, the target terminal device obtains interaction frame data from the target application. Feature extraction is performed on the interaction frame data to obtain operation data.

The target application may be specifically a MOBA game. That is, a MOBA game thread transmits the interaction frame data to the AI thread. The interaction frame data is several frames of game data in the MOBA game. The AI thread performs AI computation by using the interaction frame data, and returns a computation result to the MOBA game thread. When the MOBA game thread re-detects that the player's network is restored or an instruction of a manual operation of the player is uploaded, an AI hosting procedure may be terminated.

102: Obtain to-be-processed data corresponding to the interaction frame data by using an object control model, the object control model being obtained through training by using global interaction data.

In this embodiment, the AI thread running in the terminal device may obtain the to-be-processed data corresponding to the interaction frame data by using the object control model. The object control model is obtained through training by using global interaction data. Specifically, the MOBA game uses a large amount of game video data for training the object control model. A framework used for training includes, but is not limited to, Caffe and TensorFlow. After the operation data corresponding to the interaction frame data is inputted into the object control model, the object control model performs computation on the interaction frame data, to obtain the corresponding to-be-processed data. The to-be-processed data is used for representing data for simulating an operation such as a movement or an attack performed by the target object.

103: Process the to-be-processed data by using a data processing framework to obtain an interaction control instruction, the interaction control instruction carrying the identifier of the target object, the data processing framework being used for implementing sparse convolutional processing of data.

In some embodiments, the AI thread running in the terminal device processes the to-be-processed data by using the data processing framework to generate the interaction control instruction. In the process of generating the interaction control instruction, the terminal device uses a lightweight data processing framework. The lightweight data processing framework may perform sparse convolutional processing on data. Generally, when a ReLU function is used as an activation function, outputs are very sparse, and as a result subsequent convolutional inputs become sparse. Subsequently, the data processing framework does not compute a complete matrix multiplication, but instead only computes a non-0 output.

104: Transmit the interaction control instruction to the server by using the target application, to enable the server to transmit the interaction control instruction to at least one terminal device, the interaction control instruction being used for instructing the at least one terminal device to control the target object in the target application.

In some embodiments, after generating the interaction control instruction, the terminal device transmits the interaction control instruction to the target application server. The target application server transmits the interaction control instruction to other terminal devices in the current round of game, so that after receiving the interaction control instruction, these terminal devices can also simulate the target object as if it is controlled by the disconnected player in the target application.

In this embodiment, the method for controlling a target object is provided. In a case that an object control instruction transmitted by a server is received, a terminal device may obtain interaction frame data from a target application according to the object control instruction, the object control instruction carrying an identifier of a target object, then obtain to-be-processed data corresponding to the interaction frame data by using an object control model, and then process the to-be-processed data by using a data processing framework to obtain an interaction control instruction, the interaction control instruction carrying the identifier of the target object, the data processing framework being used for implementing sparse convolutional processing of data. Finally, the terminal device transmits the interaction control instruction to the server by using the target application, to enable the server to transmit the interaction control instruction to at least one terminal device, the interaction control instruction being used for instructing the at least one terminal device to control the target object in the target application. Accordingly, the terminal device may predict the operations of a player by using a data processing framework. The data processing framework may implement sparse convolutional processing of data. Therefore, the amount of data processing is greatly reduced, the consumption of internal memory is effectively reduced, and the operating speed is increased at the same time, so that the performance of the terminal device can be significantly increased.

In some embodiments, based on the foregoing embodiment corresponding to FIG. 4, in a first optional embodiment of the method for controlling a target object provided in this embodiment, the obtaining to-be-processed data corresponding to the interaction frame data by using an object control model may include:

obtaining first to-be-processed data corresponding to first interaction frame data by using the object control model, the first interaction frame data corresponding to M frames of data in the interaction frame data, M being a positive integer; and obtaining second to-be-processed data corresponding to second interaction frame data by using the object control model, the second interaction frame data corresponding to N frames of data in the interaction frame data, N being a positive integer, N being less than M; and the processing the to-be-processed data by using a data processing framework to obtain an interaction control instruction may include:

processing the first to-be-processed data by using the data processing framework to obtain a first interaction control instruction; and processing the second to-be-processed data by using the data processing framework to obtain a second interaction control instruction.

In this embodiment, based on a target application (for example, a MOBA game), two types of instructions, namely, an AI overall view instruction (that is, a first interaction control instruction) and an AI micromanagement instruction (that is, a second interaction control instruction), are generated according to a player's operations. This is because in an applicable program of a MOBA game type, an object controlled by a player needs to know positions of turret defending, minion clearing, jungling, ganking, backing up, and the like on an entire map. Therefore, the AI overall view instruction is an instruction of controlling the target object to move. In addition, specific operations such as strafing and skill casting of the target object may be controlled by using the AI micromanagement instruction.

Figure 5:
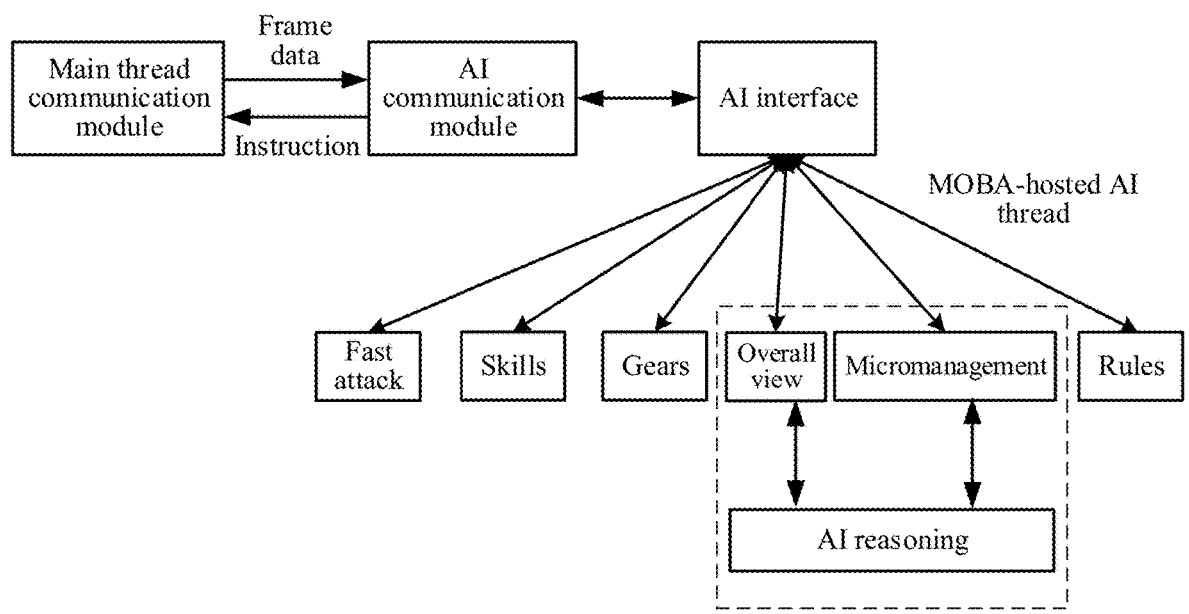
FIG. 5 is a schematic diagram of an application procedure of a data processing framework according to an embodiment of this application.

For ease of understanding, FIG. 5 is a schematic diagram of an application procedure of a data processing framework according to an embodiment of this application. As shown in the figure, when a player has been disconnected for about two minutes or remains still for two minutes, a server of the target application (for example, the MOBA game) may select a player's terminal device with adequate capacity to transmit an AI hosting command. To avoid the impact on the service computation of a main thread of the target application, the main thread of the target application of the terminal device starts a hosting AI thread in addition. A main thread communication module of the target application transmits interaction frame data to an AI communication module of the AI thread. The AI communication module implements various operations of the target object by using an AI interface. After steps such as eigen-extraction, logical determination, and computation, the AI thread eventually returns an operation instruction of the hosted player to the main thread communication module of the target application.

The terminal device obtains first to-be-processed data corresponding to first interaction frame data by using the object control model. The first interaction frame data corresponds to M frames of data in the interaction frame data, and M may be 15. That is, for a MOBA game with 15 frames per second, the overall view computation is performed once every 15 frames. The terminal device obtains second to-be-processed data corresponding to second interaction frame data by using the object control model. The second interaction frame data corresponding to N frames of data in the interaction frame data, and N may be 2. That is, for a MOBA game with 15 frames per second, micromanagement computation is performed once every two frames.

The terminal device processes the first to-be-processed data by using the data processing framework to obtain a first interaction control instruction. The first interaction control instruction is usually used for controlling the movement of the target object. The terminal device processes the second to-be-processed data by using the data processing framework to obtain a second interaction control instruction. The second interaction control instruction is usually used for controlling the normal attack, skills, gears, and the like of the target object.

As seen from the operation results, in some embodiments, the volume of a dynamic library generated from AI decoding is less than 200 kilobytes. For the overheads of operation resources, the disconnection and hosting of Honor of Kings are used as an example. On Samsung S8, the overall view operation takes an average of 15 milliseconds, a micromanagement takes an average of 5 milliseconds, and the additional consumption of the internal memory caused by the operation of Honor of Kings does not exceed 10 megabytes.

Next, in this embodiment, for a MOBA game type-based applicable program, the terminal device may obtain the first to-be-processed data according to the M frames of data in the interaction frame data, and obtain the second to-be-processed data according to the N frames of data in the interaction frame data. Therefore, the first to-be-processed data is processed by using the data processing framework to obtain first interaction control instruction, and the second to-be-processed data is processed by using the data processing framework to obtain a second interaction control instruction. Accordingly, an instruction used for controlling an overall view and an instruction used for controlling a micromanagement may be generated by using different frames of data. This manner is applicable to an applicable program of a MOBA game type, thereby improving the operability and feasibility of the solution.

In some embodiments, based on the foregoing embodiment corresponding to FIG. 4, in a second optional embodiment of the method for controlling a target object provided in this embodiment, after the obtaining to-be-processed data corresponding to the interaction frame data by using an object control model, the method may further include:

extracting operation eigen-information according to the to-be-processed data, the operation eigen-information including a first eigenelement set and a second eigenelement set, a quantity of elements in the first eigenelement set being less than a quantity of elements in the second eigenelement set; and obtaining the first eigenelement set from the operation eigen-information; and the processing the to-be-processed data by using a data processing framework to obtain an interaction control instruction may include:

generating a depth map according to the first eigenelement set, the depth map including a plurality of boundary elements and a plurality of internal elements;

for each boundary element in the plurality of boundary elements, performing convolutional computation by using three adjacent elements, or, performing convolutional computation by using five adjacent elements, to obtain a first convolutional result;

for each internal element in the plurality of internal elements, performing convolutional computation by using eight adjacent elements, to obtain a second convolutional result;

generating a target convolutional result according to the first convolutional result and the second convolutional result; and generating an interaction control instruction according to the target convolutional result.

In this embodiment, after the obtaining the to-be-processed data corresponding to the interaction frame data by using the object control model, the terminal device first performs eigen-extraction on the to-be-processed data to obtain operation eigen-information. Such operation eigen-information includes a first eigenelement set and a second eigenelement set. The first eigenelement set includes elements with an eigenvalue of "1", and the second eigenelement set includes elements with an eigenvalue of "0". During actual application, a quantity of elements with an eigenvalue of "1" is much less than a quantity of elements with an eigenvalue of "0". Therefore, the terminal device only extracts elements with an eigenvalue of "1", that is, obtains the first eigenelement set, and generates a depth map according to the first eigenelement set.

Figures 6, 7:
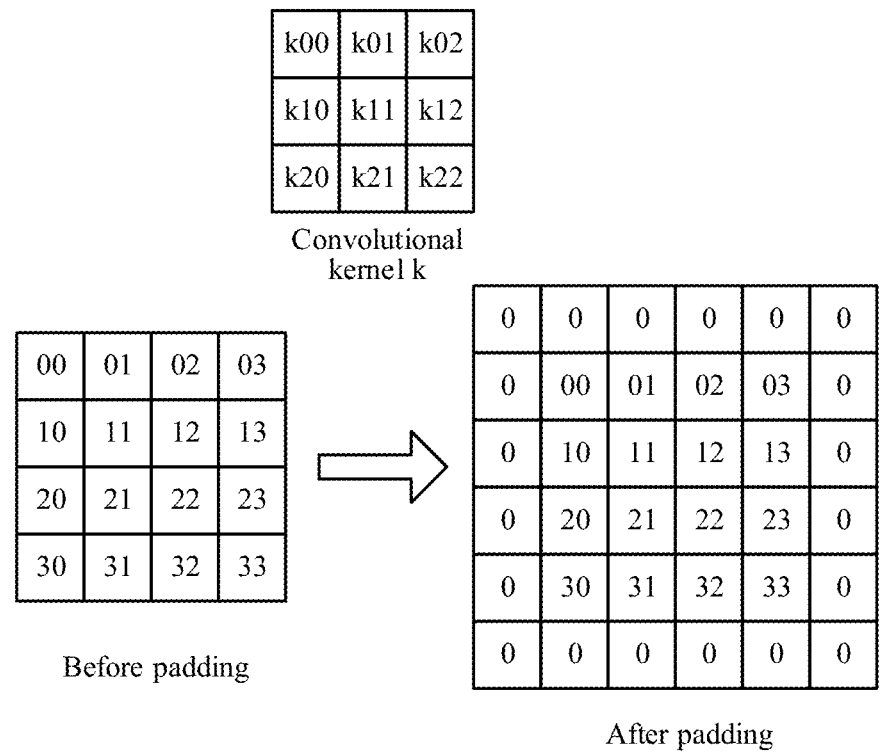
FIG. 6 is a schematic diagram of an embodiment of a padding map according to an embodiment of this application.
FIG. 7 is a schematic diagram of an embodiment of a depth map according to an embodiment of this application.
Figure 8:
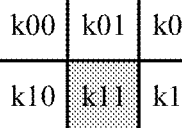
FIG. 8 is a schematic diagram of an embodiment of performing convolutional computation by using a depth map according to an embodiment of this application.

For ease of understanding, FIG. 6 is a schematic diagram of an embodiment of a padding map according to an embodiment of this application. As shown in the figure, the depth map on the left side in FIG. 6 is padded to form a padding map on the right side of FIG. 6. The depth map is specifically shown in FIG. 7. FIG. 7 is a schematic diagram of an embodiment of a depth map according to an embodiment of this application, as can be seen, a00, a01, a02, a03, a11), a11, a12, a13, a20, a21, a22, a23, a30, a31, a32, and a33. The depth map includes boundary elements and internal elements. The boundary elements are a00, a01, a02, a03, a10, a13, a20, a23, a30, a31, a32, and a33. The internal elements are a11, a12, a21, and a22. Assuming a convolutional kernel k, the convolutional kernel k includes elements k00, k01, k02, k10, k11, k12, k20, k21, and k22. FIG. 8 is a schematic diagram of an embodiment of performing convolutional computation by using a depth map according to an embodiment of this application. As shown in the figure, during the computation of the boundary element (00) in the depth map, the following manner may be used:

$$Q = k11a00 + k12a01 + k21a10 + k22a11,$$

where because values corresponding to k00, k01, k02, k10, and k20 are 0, these values do not need to be used for computation. Therefore, for four vertex elements in the boundary elements, the three adjacent elements (that is, a total of four elements) are used to perform convolutional computation, to obtain a first convolutional result Q.

During the computation of the boundary element (01) in the depth map, the following manner may be used:

$$Q=k10a00+k11a01+k12a10+k20a10+k21a11+k22a12,$$

where because values corresponding to k00, k01, and k02 are 0, these values do not need to be used for computation. Therefore, for non-vertex boundary elements in the boundary elements, five adjacent elements (that is, a total of six elements) are used to perform convolutional computation, to obtain the first convolutional result Q.

During the computation of the internal element (11) in the depth map, the following manner may be used:

$$Q=k00a00+k01a01+k02a02+k10a10+k11a11+k12a12+k20a20+k21a21+k22a22,$$

where for the internal elements in the boundary elements, eight adjacent elements (that is, a total of nine elements) are used to perform convolutional computation, to obtain the first convolutional result Q.

Finally, the terminal device generates a target convolutional result according to the first convolutional result and the second convolutional result, and generates an interaction control instruction according to the target convolutional result.

It may be understood that a convolutional network usually performs a 0-padding operation on a computing boundary. In a conventional computation manner, a process of performing padding and then performing direct convolutional computation is usually used. However, in consideration of that an AI model based on a MOBA game is generally relatively small. Therefore, the time occupied by padding is relatively long, and the time of overall computation is also relatively long. Therefore, in this application, padded elements are no longer added to convolutional computation. In addition, a convolutional computation manner includes, but is not limited to, direct convolution, matrix multiplication and winograd.

Next, in this embodiment, the terminal device extracts operation eigen-information according to the to-be-processed data, then obtains the first eigenelement set from the operation eigen-information, only generates a depth map according to the first eigenelement set, the depth map including a plurality of boundary elements and a plurality of internal elements, for each boundary element in the plurality of boundary elements, performs convolutional computation by using three adjacent elements, or, performs convolutional computation by using five adjacent elements, to obtain a first convolutional result, then for each internal element in the plurality of internal elements, performs convolutional computation by using eight adjacent elements, to obtain a second convolutional result, finally generates a target convolutional result according to the first convolutional result and the second convolutional result, and generates an interaction control instruction according to the target convolutional result. Accordingly, sparse convolutional computation is used, only non-0 values are recorded in a conv layer, and also only non-0 values are computed in convolutional computation, thereby improving the computing efficiency and effectively reducing the storage consumption and computing time.

In some embodiments, based on the foregoing embodiment corresponding to FIG. 4, in a third optional embodiment of the method for controlling a target object provided in this embodiment, before the processing the to-be-processed data by using a data processing framework to obtain an interaction control instruction, the method may further include:

operating the data processing framework by using an ARM-based instruction set.

In this embodiment, a central processing unit (CPU) running on the terminal device is implemented based on an Advanced Reduced Instruction Set Computer Machines (ARM) architecture, and an ARM Neon instruction set is used to operate the data processing framework and process an algorithm of the data processing framework.

The ARM Neon instruction set includes a normal instruction, a wide instruction, a narrow instruction, a saturation instruction, a long instruction, and the like. The normal instruction instructs to perform an operation on any vector type and generates result vectors same in size and having a type that is usually the same as the type of an operant vector. The wide instruction instructs to perform an operation on one double-word vector operant and one four-word vector operant. This type of instruction generates a four-word vector result. The generated element and the element of the first operant have widths twice the width of the element of the second operant. The narrow instruction instructs to perform an operation on a four-word vector operant and generates a double-word vector result. The generated element usually has a width half the width of the element of the operant. The saturation instruction instructs to automatically impose a limitation within a range when an exceeding data type specifies the range. The long instruction instructs to perform an operation on a double-word vector operant, and generates a four-word vector result. The generated element usually has a width twice the width of the element of the operant, and the elements are of the same type.

NEON is an advanced single instruction multiple data (SIMD) extension set, and is a SIMD instruction set that combines 64 bits and 128 bits and has a capability of normalization acceleration for multimedia and signal processing programs. NEON may perform audio effect decoding on a CPU of 10 mega Hertz (MHz), and may perform Global System for Mobile Communications (GSM) adaptive multi-rate (AMR) speech encoding below a frequency of 13 MHz. NEON has a group of extensive instruction sets, respective register arrays, and hardware capable of independent execution. NEON supports integers of 8 bits, 16 bits, 32 bits, and 64 bits and single-precision float data. In a NEON technology, SIMD may support at most 16 operations at the same time.

Next, in this embodiment, before processing the to-be-processed data by using a data processing framework to obtain an interaction control instruction, the terminal device may further operate the data processing framework by using an ARM NEON-based instruction set. Accordingly, the ARM Neon instruction set can duplicate a plurality of operants and pack the operants in a group of instruction sets of a large-scale register. Therefore, during the processing of some algorithms, parallel processing can be performed, thereby greatly improving the computing efficiency of the data processing framework.

In some embodiments, based on FIG. 4 and any one of the first to third embodiments corresponding to FIG. 4, in a fourth optional embodiment of the method for controlling a target object provided in this embodiment, the processing the to-be-processed data by using a data processing framework may include:

processing the to-be-processed data in a register by using the data processing framework to obtain to-be-fused data; and processing the to-be-fused data in internal memory by using the data processing framework.

In this embodiment, the terminal device may process the to-be-processed data in the register by using the data processing framework. That is, the process of data processing is performed in the register, to obtain to-be-fused data. The to-be-fused data is processed in the internal memory of the terminal device. That is, in the terminal device, the data processing framework may process the to-be-fused data in the internal memory.

In the storage hierarchy of a computer, the computing speed of a register is fast, and the computing speed of internal memory is less than the computing speed of the register. Briefly, the internal memory is relatively far away from the CPU, and therefore it needs to take a longer time to read data from the CPU. A CPU of a 3 gigahertz is used as an example. The current can oscillate 3 billion times per second. Each time of oscillation takes approximately 0.33 nanoseconds. Light can move forward by 30 centimeters within 1 nanosecond. That is, within one clock cycle of the CPU, light can move forward by 10 centimeters. Therefore, assuming that the internal memory is away from the CPU by 5 centimeters, the reading of data is not completed within one clock cycle. In comparison, if the register is located inside the CPU, the reading is slightly faster.

Generally, a bit quantity of the register in the terminal device is much less than a bit quantity of the internal memory. Therefore, a high-performance, high-cost, and high-power-consumption design can be used in the register but is not suitable for the internal memory. The reason is that if the design is used in the internal memory, each bit has increased costs and energy consumption, resulting in excessively high overall costs and energy consumption the internal memory.

The working manner of the register is very simple. Only two steps are required. In the first step, related bits in the register are found. In the second step, these bits are read. A working manner of the internal memory is much more complex. Fives step are usually required. In the first step, a pointer of data is found. In the second step, the pointer is transmitted to internal memory management unit. The internal memory management unit translates a virtual internal memory address into an actual physical address. In the third step, the physical address is transmitted to an internal memory controller. The internal memory controller finds an internal memory slot shown by the address. In the fourth step, an internal memory block in which the data is located is determined, and the data is read from the block. In the fifth step, the data is first returned to the internal memory controller, is then returned to the CPU, and then starts to be used. Operations of the internal memory has many more steps than the register. A delay occurs in every step. With the accumulation of the delays, the internal memory is much slower than the register.

Based on the foregoing factors, it is ensured that the reading speed of the register is much higher than the reading speed of the memory.

Next, in this embodiment, as the terminal device processes data by using the data processing framework, data may be divided into two parts. Each part is processed in different regions. The terminal device processes the to-be-processed data in the register by using the data processing framework to obtain the to-be-fused data, and then processes the to-be-fused data in the internal memory by using the data processing framework. Accordingly, data computing may be performed in the register of the terminal device, and a computation result does not need to be written into the internal memory every time, so that the efficiency of data processing is improved, and the computing efficiency of the register is greater than the computing efficiency of the internal memory, thereby improving the efficiency of data processing.

In some embodiments, based on the fourth embodiment corresponding to FIG. 4, in a fifth optional embodiment of the method for controlling a target object provided in this embodiment, the processing the to-be-processed data in a register by using the data processing framework may include:

processing the to-be-processed data in the register by using a pooling layer and a conv layer, the pooling layer being used for regularizing and pooling the to-be-processed data, the conv layer being used for activating and normalizing the to-be-processed data.

Figure 9:
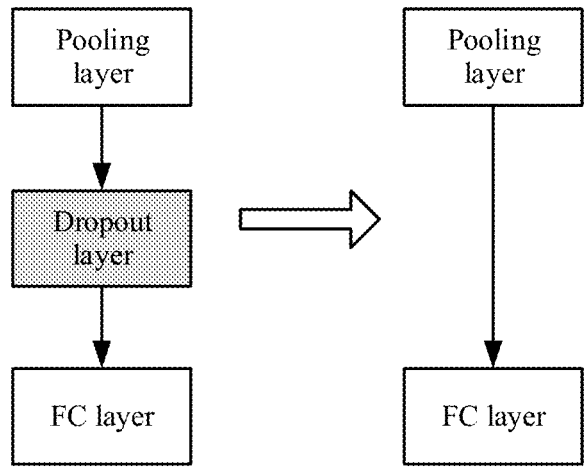
FIG. 9 is a schematic diagram of an embodiment of combining network layers according to an embodiment of this application.

In this embodiment, in consideration of that some network layers may perform computation in situ, in-situ computation may be computed without depending on moving data from and to other network layers. A network layer that may perform in-situ computation includes, but is not limited to, a ReLU layer, a BN layer, a scale layer, and a bias layer. For ease of understanding, FIG. 9 is a schematic diagram of an embodiment of combining network layers according to an embodiment of this application. As shown in the figure, the terminal device regularizes and pools data in the register by using the pooling layer. That is, the function of a dropout layer is added to the pooling layer, so that the pooling layer may implement the inherent pooling function of the pooling layer and may additionally implement the regularization function of the dropout layer. After the to-be-processed data is processed, the processed data is inputted into the FC layer. The FC layer performs fusing computation on the data in the internal memory.

Figure 10:
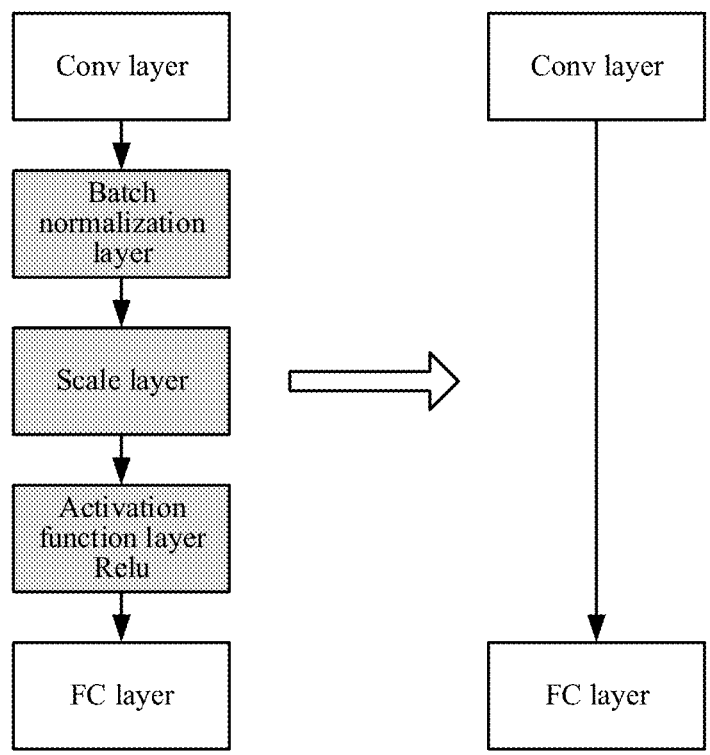
FIG. 10 is a schematic diagram of another embodiment of combining network layers according to an embodiment of this application.

FIG. 10 is a schematic diagram of another embodiment of combining network layers according to an embodiment of this application. As shown in the figure, the terminal device activates and normalizes on data in the register by using the conv layer. That is, the function of a BN layer is added to the conv layer, and the function of the scale layer is added to the conv layer. The function of the ReLU layer is added to the conv layer, so that the conv layer may implement the inherent convolutional processing function of the conv layer and may additionally implement the normalization functions of the BN layer and the scale layer and implement the activation function of the ReLU layer. After the to-be-processed data is processed, the processed data is inputted into the FC layer, and the FC layer performs fusing computation on the data in the internal memory.

Further, in this embodiment, the terminal device processes the to-be-processed data in the register by using a pooling layer and a conv layer, the pooling layer being used for regularizing and pooling the to-be-processed data, the conv layer being used for activating and normalizing the to-be-processed data. Accordingly, some network layers in which data does not need to be changed are directly combined into a previous network layer, and these combined network layers are reduced, so that a computing amount is effectively reduced and at the same time the overall required input/output internal memory is also reduced.

In some embodiments, based on the fourth embodiment corresponding to FIG. 4, in a sixth optional embodiment of the method for controlling a target object provided in this embodiment, the processing the to-be-fused data in internal memory by using the data processing framework may include:

processing the to-be-fused data in the internal memory by using an FC layer, the to-be-fused data including first to-be-fused data and second to-be-fused data, the FC layer being used for concatenating the first to-be-fused data and the second to-be-fused data, and fusing the first to-be-fused data and the second to-be-fused data.

Figure 11:
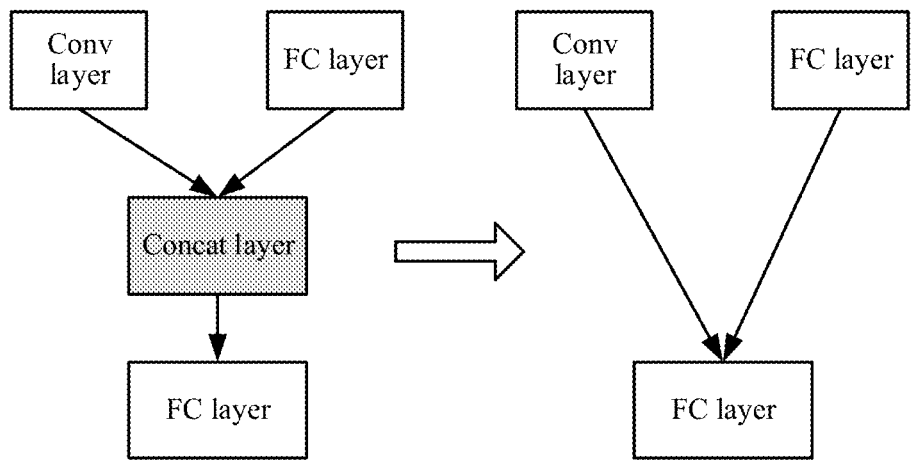
FIG. 11 is a schematic diagram of an embodiment of deleting a network layer according to an embodiment of this application.

In this embodiment, the terminal device may directly process the to-be-fused data in the internal memory by using the FC layer. The to-be-fused data at least includes first to-be-fused data and second to-be-fused data. It is assumed that the first to-be-fused data is data A, and the second to-be-fused data is data B. The FC layer performs fusing computation on the data A and the data B. For ease of understanding, FIG. 11 is a schematic diagram of an embodiment of deleting a network layer according to an embodiment of this application. As shown in the figure, the cony layer performs convolutional processing to obtain first to-be-fused data, and a previous FC layer performs data fusing computation to obtain second to-be-fused data. Finally, the terminal device directly performs data processing on the first to-be-fused data and the second to-be-fused data in the internal memory by using a next FC layer, and a concat layer is no longer needed to concatenate the first to-be-fused data and the second to-be-fused data.

The function of the concat layer is to concatenate two or more feature maps according to the channel or data dimensionality, and there is no operation of an eltwise layer (the eltwise layer has three operations, namely, a dot product, addition/subtraction, and calculating a maximum value). For example, if concatenation conv_9 and deconv_9 are performed in channel dimensionality, first, the channel dimensionalities may not be the same, and the remaining dimensionalities need to be consistent (that is, data, convolutional input heights, and convolutional input widths are consistent). In this case, the operation is only to add channelk1 of conv_9 to channelk2 of deconv_9. blob outputted by the concat layer may be represented as $N*(k1+k2)*H*W$. Generally, in consideration of that the concat layer intends to concatenate feature maps with the same size, a manner of concatenation is as follows:

selecting axis=0, representing that concatenation in data dimensionality, which may be represented as: $(k1+k2)*C*H*W$; and selecting axis=1, representing that concatenation in channel dimensionality, which may be represented as: $N*(k1+k2)*H*W$.

Further, in this embodiment, the terminal device may process the to-be-fused data in the internal memory by using an FC layer, the to-be-fused data including first to-be-fused data and second to-be-fused data, the FC layer being used for concatenating the first to-be-fused data and the second to-be-fused data, and fuse the first to-be-fused data and the second to-be-fused data. Accordingly, the reduction of concat network layers can effectively reduce a computing amount, and at the same time the overall required input/output internal memory is reduced.

In some embodiments, based on FIG. 4 and any one of the first to third embodiments corresponding to FIG. 4, in a seventh optional embodiment of the method for controlling a target object provided in this embodiment, the processing the to-be-processed data by using a data processing framework may include:

obtaining to-be-processed data from first internal memory;

performing convolutional processing on the to-be-processed data to obtain a convolutional processing result, the convolutional processing result being stored in second internal memory, the second internal memory and the first internal memory being two different pieces of preallocated internal memory;

obtaining the convolutional processing result from the second internal memory; and performing data fusion on the convolutional processing result to obtain a fusion result, the fusion result being stored in the first internal memory.

Figure 12:
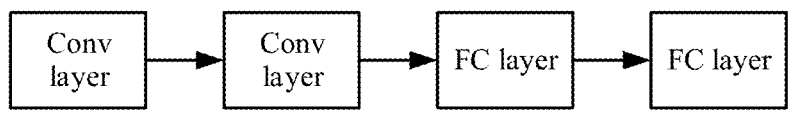
FIG. 12 is a schematic diagram of an embodiment of a chain network structure according to an embodiment of this application.

In this embodiment, a double buffer may further be used for a chain network structure to allocate the largest input size and the largest output size required in the entire network, and the two parts are then cyclically used to implement the reuse of the internal memory. FIG. 12 is a schematic diagram of an embodiment of a chain network structure according to an embodiment of this application. As shown in the figure, the chain network structure has one input and one output. The chain network structure in FIG. 12 is only an example. During actual application, the order of the two conv layers and two FC layers is not limited.

Figure 13:
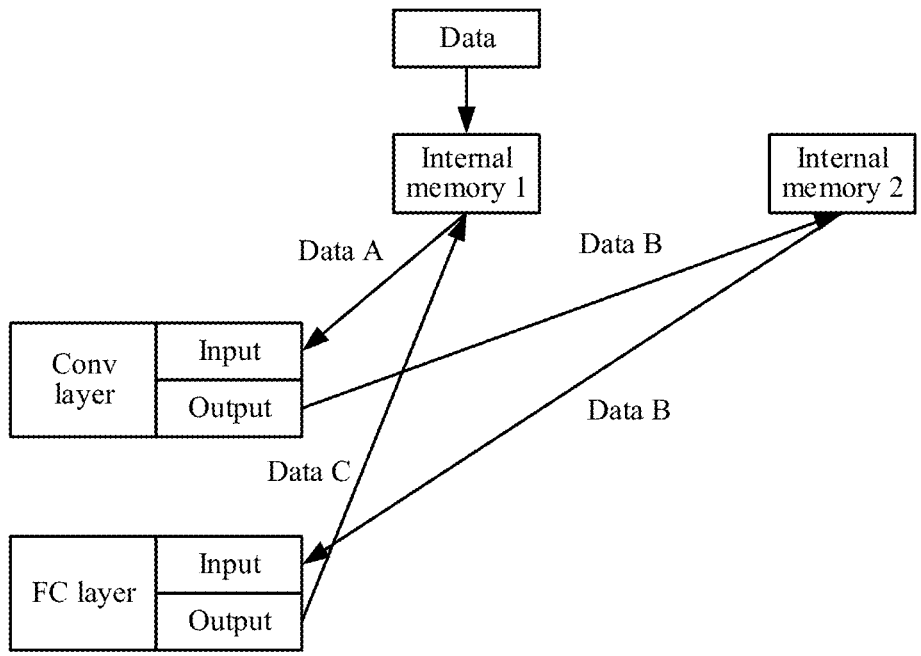
FIG. 13 is a schematic diagram of data processing based on a chain network structure according to an embodiment of this application.

For ease of description, FIG. 13 is a schematic diagram of data processing based on a chain network structure according to an embodiment of this application. As shown in the figure, assuming that to-be-processed data is stored in internal memory 1 (that is, the first internal memory), an input pointer of a conv layer instructs to extract data A from the internal memory 1, and convolutional processing is performed to obtain a convolutional processing result, that is, to obtain data B. An output pointer of the conv layer then instructs to store the data B in an internal memory 2. An input pointer of the FC layer instructs to extract the data B from the internal memory 1, and data fusing computation is performed to obtain a fusion result, that is, to obtain data C. An output pointer of the FC layer then instructs to store the data C in the internal memory 1.

The internal memory 1 and the internal memory 2 are two different pieces of preallocated internal memory.

Next, in this embodiment, the terminal device may obtain to-be-processed data from first internal memory, perform convolutional processing on the to-be-processed data to obtain a convolutional processing result, the convolutional processing result being stored in second internal memory, the second internal memory and the first internal memory being two different pieces of preallocated internal memory, then obtain the convolutional processing result from the second internal memory, and then perform data fusion on the convolutional processing result to obtain a fusion result, the fusion result being stored in the first internal memory. Accordingly, a double buffer mechanism may be used for a chain network structure, and the two parts of internal memory are cyclically used, thereby implementing the reuse of internal memory, so that the internal memory utilization of the terminal device is increased.

In some embodiments, based on FIG. 4 and any one of the first to third embodiments corresponding to FIG. 4, in an eighth optional embodiment of the method for controlling a target object provided in this embodiment, the processing the to-be-processed data by using a data processing framework may include:

performing convolutional processing on the to-be-processed data to obtain a convolutional processing result, the convolutional processing result being stored in a target internal memory;

performing data fusion on the to-be-processed data to obtain a first fusion result, the first fusion result being stored in the target internal memory;

obtaining the convolutional processing result and the first fusion result from the target internal memory; and performing data fusion on the convolutional processing result and the first fusion result to obtain a second fusion result.

Figure 14:
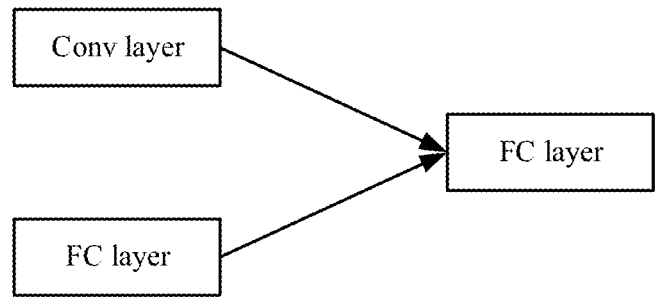
FIG. 14 is a schematic diagram of an embodiment of a multi-input network structure according to an embodiment of this application.

In this embodiment, for a multi-input network structure, only internal memory may be allocated for an input of a child node. An output pointer of the child node points at a parent node, thereby implementing the reuse of internal memory at a connection point. FIG. 14 is a schematic diagram of an embodiment of a multi-input network structure according to an embodiment of this application. As shown in the figure, the multi-input network structure in FIG. 14 is only an example. During actual application, another type of network layer may be used as a child node, or another type of network layer may be used as a parent node.

Figure 15:
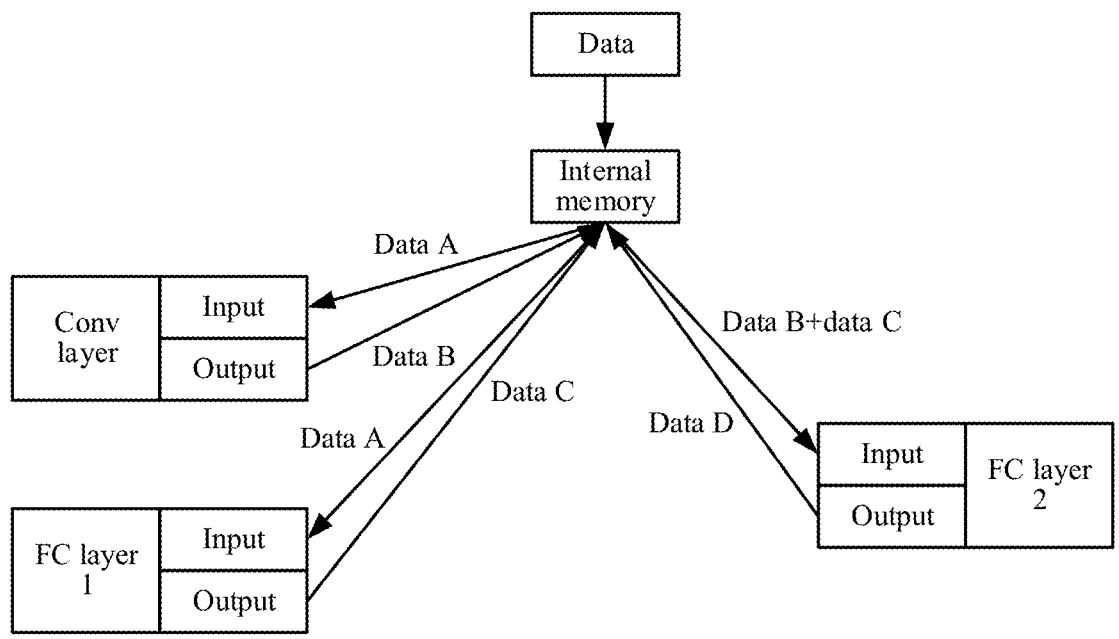
FIG. 15 is a schematic diagram of data processing based on a multi-input network structure according to an embodiment of this application.

For ease of description, FIG. 15 is a schematic diagram of data processing based on a multi-input network structure according to an embodiment of this application. As shown in the figure, assuming that to-be-processed data is stored in internal memory (that is, the target internal memory), an input pointer of the conv layer instructs to extract the data A from the internal memory, and convolutional processing is performed to obtain a convolutional processing result, that is, to obtain data B. An output pointer of the conv layer then instructs to store the data B in the internal memory. An input pointer of an FC layer 1 instructs to extract the data A from the internal memory, and data fusion is performed to obtain a first fusion result, that is, to obtain data C. An output pointer of the FC layer 1 then instructs to store the data C in the internal memory. An input pointer of an FC layer 2 instructs to extract the data B and the data C from the internal memory, and data fusion is performed to obtain a second fusion result, that is, to obtain data D. An output pointer of then FC layer 2 instructs to store the data D in the internal memory.

Next, in this embodiment, the terminal device may perform convolutional processing on the to-be-processed data to obtain a convolutional processing result, the convolutional processing result being stored in a target internal memory, then perform data fusion on the to-be-processed data to obtain a first fusion result, the first fusion result being stored in the target internal memory, and then obtain the convolutional processing result and the first fusion result from the target internal memory. Finally, the terminal device performs data fusion on the convolutional processing result and the first fusion result to obtain a second fusion result. Accordingly, for a multi-input network structure, only internal memory may be allocated to an input of a child node, an output of a parent node is reduced, and a node input is shared, thereby implementing the reuse of internal memory at a connection point, so that the internal memory utilization of the terminal device is increased.

In some embodiments, based on FIG. 4 and any one of the first to third embodiments corresponding to FIG. 4, in a ninth optional embodiment of the method for controlling a target object provided in this embodiment, the processing the to-be-processed data by using a data processing framework may include:

performing convolutional processing on the to-be-processed data to obtain a convolutional processing result, the convolutional processing result being stored in a target internal memory;

obtaining a first convolutional processing result from the target internal memory; and fusing the first convolutional processing result to obtain a fusion result, and/or, performing convolutional processing on the first convolutional processing result to obtain a second convolutional processing result.

Figure 16:
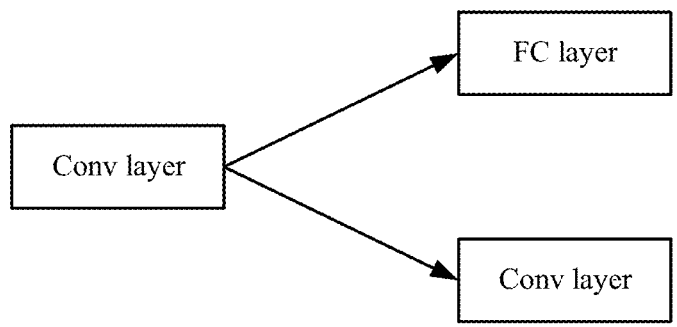
FIG. 16 is a schematic diagram of an embodiment of a multi-output network structure according to an embodiment of this application.

In this embodiment, for a multi-output network structure, only internal memory may be allocated to an output of a parent node, and an input pointer of a child node points at the parent node, thereby implementing the reuse of internal memory at a connection point. FIG. 16 is a schematic diagram of an embodiment of a multi-output network structure according to an embodiment of this application. As shown in the figure, the multi-output network structure in FIG. 16 is only an example. During actual application, another type of network layer may be used as a child node, or another type of network layer may be used as a parent node.

Figure 17:
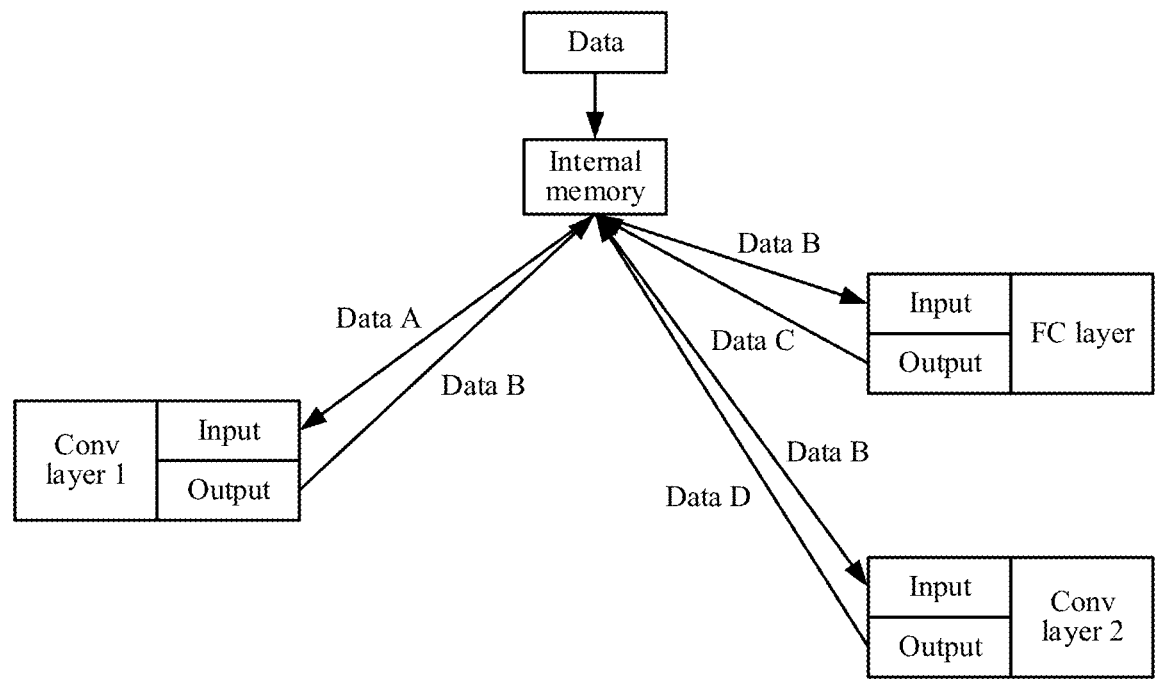
FIG. 17 is a schematic diagram of data processing based on a multi-output network structure according to an embodiment of this application.

For ease of description, FIG. 17 is a schematic diagram of data processing based on a multi-output network structure according to an embodiment of this application. As shown in the figure, assuming that to-be-processed data is stored in internal memory (that is, a target internal memory). An input pointer of a conv layer 1 instructs to extract data A from the internal memory, and performs convolutional processing to obtain a first convolutional processing result, that is, to obtain data B, and an output pointer of the conv layer 1 then instructs to store the data B in the internal memory.

An input pointer of the FC layer instructs to extract the data B from the internal memory, and data fusion is performed to obtain data C. An output pointer of the FC layer 1 instructs to store the data C in the internal memory. Alternatively, an input pointer of the conv layer 2 instructs to extract the data B from the internal memory, and convolutional computation is performed to obtain a second convolutional processing result, that is, obtain data D. An output pointer of the conv layer 2 instructs to store the data D in the internal memory.

Next, in this embodiment, the terminal device may obtain a first convolutional processing result from the target internal memory, then fuse the first convolutional processing result to obtain a fusion result, and/or, perform convolutional processing on the first convolutional processing result to obtain a second convolutional processing result. Accordingly, for a multi-output network structure, only internal memory may be allocated to an output of a parent node, an input of a child node is reduced, and an output of a node is shared, thereby implementing the reuse of internal memory at a connection point, so that the internal memory utilization of the terminal device is increased.

In some embodiments, based on the foregoing embodiment corresponding to FIG. 4, in a tenth optional embodiment of the method for controlling a target object provided in this embodiment, before the obtaining interaction frame data from a target application according to the object control instruction, the method may further include:

obtaining a capacity parameter of the terminal device; and selecting a target matching template from a preset framework matching template set according to an operation parameter, the preset framework matching template set including at least one matching template, each matching template including a parameter used in the data processing framework; and the processing the to-be-processed data by using a data processing framework to obtain an interaction control instruction may include:

processing the to-be-processed data according to the target matching template and by using the data processing framework to obtain the interaction control instruction.

In this embodiment, during actual application, the terminal device may further first obtain a capacity parameter of the terminal device. The capacity parameter includes, but is not limited to, a network delay time, an internal memory size, a supported routing protocol, a device model, and a modulation scheme. As the terminal device updates a target application, a small period of time (for example, about 1 second) is additionally used to operate different matching templates, perform dynamic testing, and generate the most suitable target matching template in a current performance state, so that the to-be-processed data is processed according to a parameter corresponding to the target matching template and by using a data processing framework to obtain an interaction control instruction.

For a matching template, different matching templates correspond to different rules. These rules are not suitable for all scenarios and the terminal device. Therefore, rules are flexibly set according to different scenario types and capacity parameters of the terminal device, to further improve framework operation efficiency. Table 1 shows rules in different matching templates.

TABLE 1

| Matching template | Convolutional input channel quantity | Convolutional input length | Convolutional input width | Convolutional input height |
|---|---|---|---|---|
| 1 | 2 | 2 | 2 | 2 |
| 2 | 4 | 3 | 3 | 3 |
| 3 | 6 | 4 | 4 | 4 |
| 4 | 8 | 5 | 5 | 5 |
| 5 | 10 | 6 | 6 | 6 |
| 6 | 12 | 7 | 7 | 7 |
| 7 | 14 | 8 | 8 | 8 |

As shown in Table 1, different matching templates usually correspond to different rules. These rules include, but are not limited to, the convolutional input channel quantity, convolutional input length, convolutional input widths, convolutional input height, and computer buffer size mentioned in Table 1.

Next, in this embodiment, before obtaining the interaction frame data from the target application according to the object control instruction, a target terminal device may further obtain a capacity parameter of the terminal device, and select a target matching template from a preset framework matching template set according to an operation parameter, the preset framework matching template set including at least one matching template, each matching template including a parameter used in the data processing framework. The target terminal device then processes the to-be-processed data according to the target matching template and by using the data processing framework to obtain the interaction control instruction. Accordingly, a user may configure different matching templates in advance. The terminal device selects the most suitable template according to the operation status of the terminal device, and implements the computation of the data processing framework based on the template, thereby implementing the optimal performance configuration of the data processing framework at the terminal device. During the actual operation of AI, the parameter correspondingly configured for the template is directly loaded, to enable the AI to achieve optimal performance.

The method for controlling a target object provided in this application is mainly deployed on the terminal device. In consideration of an application scenario in which this type of MOBA game has a high requirement for operational real-time performance and high resource consumption and other application scenarios of AI running on the terminal device, a group of experimental data is used as an example below to describe the performance of using the method for controlling a target object in the foregoing application scenario. Table 2 shows specific performance indicators.

TABLE 2

| Device | Average time consumption of AI overall view | Average time consumption of AI micromanagement | Internal memory occupied by AI |
|---|---|---|---|
| Samsung S8 | 15 milliseconds | 5 milliseconds | 10 megabytes |

An application scenario of disconnection and hosting in a MOBA game Honor of Kings on the phone Samsung S8 is used as an example. It is analyzed from the perspective of testing and evaluation, an average time consumption of the operation of overall view is 15 milliseconds, the average time consumption of micromanagement is 5 milliseconds, and the additional consumption of the internal memory caused by the AI in the MOBA game does not exceed 10 megabytes. The frame rate, freezing, and power consumption of the game have significant changes, and AI performance is desirable.

Figure 18:
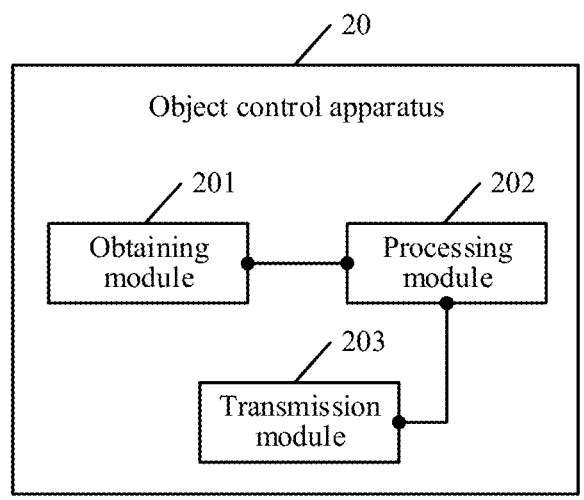
FIG. 18 is a schematic diagram of an embodiment of an object control apparatus according to an embodiment of this application.

The object control apparatus in this application is described below in detail. FIG. 18 is a schematic diagram of an embodiment of an object control apparatus according to an embodiment of this application. The object control apparatus 20 includes:

an obtaining module 201, configured to: receive an object control instruction transmitted by a server, and obtain interaction frame data from a target application according to the object control instruction, the object control instruction carrying an identifier of a target object;

the obtaining module 201 being further configured to obtain to-be-processed data corresponding to the interaction frame data by using an object control model, the object control model being obtained through training by using global interaction data;

the processing module 202 being configured to process, by using a data processing framework, the to-be-processed data obtained by the obtaining module 201 to obtain an interaction control instruction, the interaction control instruction carrying the identifier of the target object, the data processing framework being used for implementing sparse convolutional processing of data; and the transmission module 203 being configured to transmit to the server by using the target application, the interaction control instruction obtained through processing by the processing module 202, the interaction control instruction being used for instructing the at least one terminal device to control the target object in the target application.

In this embodiment, an object control instruction transmitted by a server is received. The obtaining module 201 obtains interaction frame data from a target application according to the object control instruction, the object control instruction carrying an identifier of a target object. The obtaining module 201 obtains to-be-processed data corresponding to the interaction frame data by using an object control model, the object control model being obtained through training by using global interaction data. The processing module 202 processes, by using a data processing framework, the to-be-processed data obtained by the obtaining module 201 to obtain an interaction control instruction, the interaction control instruction carrying the identifier of the target object, the data processing framework being used for implementing sparse convolutional processing of data, transmission module 203 transmits, to the server by using the target application, the interaction control instruction obtained through processing by the processing module 202, to enable the server to transmit the interaction control instruction to at least one terminal device, the interaction control instruction being used for instructing the at least one terminal device to control the target object in the target application.

In this embodiment, an object control apparatus is provided. An object control instruction transmitted by a server is received. The terminal device may obtain interaction frame data from a target application according to the object control instruction, the object control instruction carrying an identifier of a target object, then obtain to-be-processed data corresponding to the interaction frame data by using an object control model, and then process the to-be-processed data by using a data processing framework to obtain an interaction control instruction, the interaction control instruction carrying the identifier of the target object, the data processing framework being used for implementing sparse convolutional processing of data. Finally, the terminal device transmits the interaction control instruction to the server by using the target application, to enable the server to transmit the interaction control instruction to at least one terminal device, the interaction control instruction being used for instructing the at least one terminal device to control the target object in the target application. Accordingly, the terminal device may predict the operations of a player by using a data processing framework. The data processing framework may implement sparse convolutional processing of data. Therefore, the amount of data processing is greatly reduced, the consumption of internal memory is effectively reduced, and the operating speed is increased at the same time, so that the performance of the terminal device can be significantly increased.

In some embodiments, based on the foregoing embodiment corresponding to FIG. 18, in another embodiment of the object control apparatus 20 provided in this embodiment, the obtaining module 201 is specifically configured to:
obtain first to-be-processed data corresponding to first interaction frame data by using the object control model, the first interaction frame data corresponding to M frames of data in the interaction frame data, M being a positive integer; and obtain second to-be-processed data corresponding to second interaction frame data by using the object control model, the second interaction frame data corresponding to N frames of data in the interaction frame data, N being a positive integer, N being less than M; and the processing module 202 is specifically configured to:
process the first to-be-processed data by using the data processing framework to obtain a first interaction control instruction; and process the second to-be-processed data by using the data processing framework to obtain a second interaction control instruction.

Next, in this embodiment, for a MOBA game type-based applicable program, the terminal device may obtain the first to-be-processed data according to the M frames of data in the interaction frame data, and obtain the second to-be-processed data according to the N frames of data in the interaction frame data. Therefore, the first to-be-processed data is processed by using the data processing framework to obtain first interaction control instruction, and the second to-be-processed data is processed by using the data processing framework to obtain a second interaction control instruction. Accordingly, an instruction used for controlling an overall view and an instruction used for controlling a micromanagement may be generated by using different frames of data. This manner is applicable to an applicable program of a MOBA game type, thereby improving the operability and feasibility of the solution.

Figure 19:
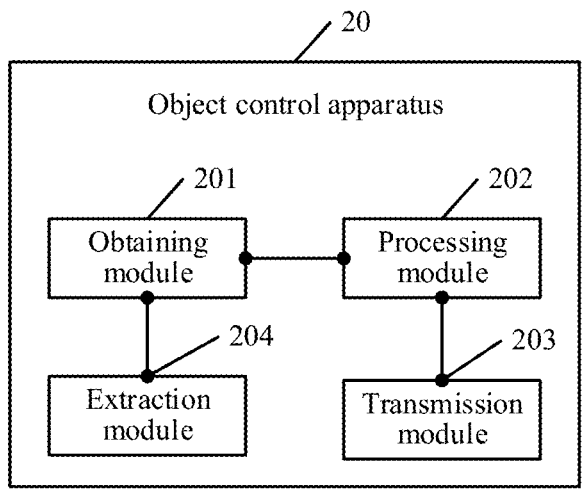
FIG. 19 is a schematic diagram of another embodiment of an object control apparatus according to an embodiment of this application.

In some embodiments, based on the foregoing embodiment corresponding to FIG. 18, referring to FIG. 19, in another embodiment of the object control apparatus 20 provided in this embodiment, the object control apparatus 20 further includes an extraction module 204, the extraction module 204 being configured to extract, after the obtaining module 201 obtains the to-be-processed data corresponding to the interaction frame data by using the object control model, operation eigen-information according to the to-be-processed data, the operation eigen-information including a first eigenelement set and a second eigenelement set, a quantity of elements in the first eigenelement set being less than a quantity of elements in the second eigenelement set;

the obtaining module 201 being further configured to obtain the first eigenelement set from the operation eigen-information extracted by the extraction module 204; and the processing module 202 being specifically configured to: generate a depth map according to the first eigenelement set, the depth map including a plurality of boundary elements and a plurality of internal elements;

for each boundary element in the plurality of boundary elements, perform convolutional computation by using three adjacent elements, or, perform convolutional computation by using five adjacent elements, to obtain a first convolutional result;

for each internal element in the plurality of internal elements, perform convolutional computation by using eight adjacent elements, to obtain a second convolutional result;

generate a target convolutional result according to the first convolutional result and the second convolutional result; and generate an interaction control instruction according to the target convolutional result.

Next, in this embodiment, the terminal device extracts operation eigen-information according to the to-be-processed data, then obtains the first eigenelement set from the operation eigen-information, only generates a depth map according to the first eigenelement set, the depth map including a plurality of boundary elements and a plurality of internal elements, for each boundary element in the plurality of boundary elements, performs convolutional computation by using three adjacent elements, or, performs convolutional computation by using five adjacent elements, to obtain a first convolutional result, then for each internal element in the plurality of internal elements, performs convolutional computation by using eight adjacent elements, to obtain a second convolutional result, finally generates a target convolutional result according to the first convolutional result and the second convolutional result, and generates an interaction control instruction according to the target convolutional result. Accordingly, sparse convolutional computation is used, only non-0 values are recorded in a conv layer, and also only non-0 values are computed in convolutional computation, thereby improving the computing efficiency and effectively reducing the storage consumption and computing time.

Figure 20:
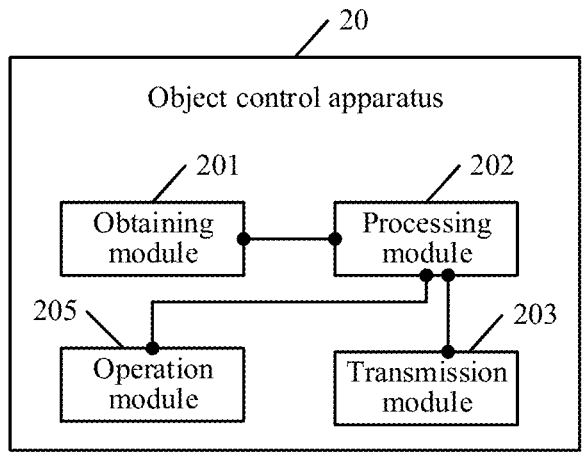
FIG. 20 is a schematic diagram of another embodiment of an object control apparatus according to an embodiment of this application.

In some embodiments, based on the foregoing embodiment corresponding to FIG. 18, referring to FIG. 20, in another embodiment of the object control apparatus 20 provided in this embodiment, object control apparatus 20 further includes an operation module 205, the operation module 205 being configured to operate, before the processing module 202 processes the to-be-processed data by using the data processing framework to obtain the interaction control instruction, the data processing framework by using an ARM-based instruction set.

Next, in this embodiment, before processing the to-be-processed data by using a data processing framework to obtain an interaction control instruction, the terminal device may further operate the data processing framework by using an ARM NEON-based instruction set. Accordingly, the ARM Neon instruction set can duplicate a plurality of operants and pack the operants in a group of instruction sets of a large-scale register. Therefore, during the processing of some algorithms, parallel processing can be performed, thereby greatly improving the computing efficiency of the data processing framework.

In some embodiments, based on the foregoing embodiment corresponding to FIG. 18, FIG. 19 or FIG. 20, in another embodiment of the object control apparatus 20 provided in this embodiment, the processing module 202 being specifically configured to: process the to-be-processed data in a register by using the data processing framework to obtain to-be-fused data; and process the to-be-fused data in internal memory by using the data processing framework.

Next, in this embodiment, as the terminal device processes data by using the data processing framework, data may be divided into two parts. Each part is processed in different regions. The terminal device processes the to-be-processed data in the register by using the data processing framework to obtain the to-be-fused data, and then processes the to-be-fused data in the internal memory by using the data processing framework. Accordingly, data computing may be performed in the register of the terminal device, and a computation result does not need to be written into the internal memory every time, so that the efficiency of data processing is improved, and the computing efficiency of the register is greater than the computing efficiency of the internal memory, thereby improving the efficiency of data processing.

In some embodiments, based on the foregoing embodiment corresponding to FIG. 18, FIG. 19 or FIG. 20, in another embodiment of the object control apparatus 20 provided in this embodiment, the processing module 202 is specifically configured to process the to-be-processed data in the register by using a pooling layer and a conv layer, the pooling layer being used for regularizing and pooling the to-be-processed data, the conv layer being used for activating and normalizing the to-be-processed data.

Further, in this embodiment, the terminal device processes the to-be-processed data in the register by using a pooling layer and a conv layer, the pooling layer being used for regularizing and pooling the to-be-processed data, the conv layer being used for activating and normalizing the to-be-processed data. Accordingly, some network layers in which data does not need to be changed are directly combined into a previous network layer, and these combined network layers are reduced, so that a computing amount is effectively reduced and at the same time the overall required input/output internal memory is also reduced.

In some embodiments, based on the foregoing embodiment corresponding to FIG. 18, FIG. 19 or FIG. 20, in another embodiment of the object control apparatus 20 provided in this embodiment, the processing module 202 is specifically configured to: process the to-be-fused data in the internal memory by using an FC layer, the to-be-fused data including first to-be-fused data and second to-be-fused data, the FC layer being used for concatenating the first to-be-fused data and the second to-be-fused data, and fuse the first to-be-fused data and the second to-be-fused data.

Further, in this embodiment, the terminal device may process the to-be-fused data in the internal memory by using an FC layer, the to-be-fused data including first to-be-fused data and second to-be-fused data, the FC layer being used for concatenating the first to-be-fused data and the second to-be-fused data, and fuse the first to-be-fused data and the second to-be-fused data. Accordingly, the reduction of concat network layers can effectively reduce a computing amount, and at the same time the overall required input/output internal memory is reduced.

In some embodiments, based on the foregoing embodiment corresponding to FIG. 18, FIG. 19 or FIG. 20, in another embodiment of the object control apparatus 20 provided in this embodiment, the processing module 202 being specifically configured to: obtain to-be-processed data from first internal memory;

perform convolutional processing on the to-be-processed data to obtain a convolutional processing result, the convolutional processing result being stored in second internal memory, the second internal memory and the first internal memory being two different pieces of preallocated internal memory;

obtain the convolutional processing result from the second internal memory; and perform data fusion on the convolutional processing result to obtain a fusion result, the fusion result being stored in the first internal memory.

Next, in this embodiment, the terminal device may obtain to-be-processed data from first internal memory, perform convolutional processing on the to-be-processed data to obtain a convolutional processing result, the convolutional processing result being stored in second internal memory, the second internal memory and the first internal memory being two different pieces of preallocated internal memory, then obtain the convolutional processing result from the second internal memory, and then perform data fusion on the convolutional processing result to obtain a fusion result, the fusion result being stored in the first internal memory. Accordingly, a double buffer mechanism may be used for a chain network structure, and the two parts of internal memory are cyclically used, thereby implementing the reuse of internal memory, so that the internal memory utilization of the terminal device is increased.

In some embodiments, based on the foregoing embodiment corresponding to FIG. 18, FIG. 19 or FIG. 20, in another embodiment of the object control apparatus 20 provided in this embodiment, the processing module 202 being specifically configured to: perform convolutional processing on the to-be-processed data to obtain a convolutional processing result, the convolutional processing result being stored in a target internal memory;

perform data fusion on the to-be-processed data to obtain a first fusion result, the first fusion result being stored in the target internal memory;

obtain the convolutional processing result and the first fusion result from the target internal memory; and perform data fusion on the convolutional processing result and the first fusion result to obtain a second fusion result.

Next, in this embodiment, the terminal device may perform convolutional processing on the to-be-processed data to obtain a convolutional processing result, the convolutional processing result being stored in a target internal memory, then perform data fusion on the to-be-processed data to obtain a first fusion result, the first fusion result being stored in the target internal memory, and then obtain the convolutional processing result and the first fusion result from the target internal memory. Finally, the terminal device performs data fusion on the convolutional processing result and the first fusion result to obtain a second fusion result. Accordingly, for a multi-input network structure, only internal memory may be allocated to an input of a child node, an output of a parent node is reduced, and a node input is shared, thereby implementing the reuse of internal memory at a connection point, so that the internal memory utilization of the terminal device is increased.

In some embodiments, based on the foregoing embodiment corresponding to FIG. 18, FIG. 19 or FIG. 20, in another embodiment of the object control apparatus 20 provided in this embodiment, the processing module 202 is specifically configured to: perform convolutional processing on the to-be-processed data to obtain a convolutional processing result, the convolutional processing result being stored in a target internal memory;

obtain a first convolutional processing result from the target internal memory; and fuse the first convolutional processing result to obtain a fusion result, and/or, perform convolutional processing on the first convolutional processing result to obtain a second convolutional processing result.

Next, in this embodiment, the terminal device may obtain a first convolutional processing result from the target internal memory, then fuse the first convolutional processing result to obtain a fusion result, and/or, perform convolutional processing on the first convolutional processing result to obtain a second convolutional processing result. Accordingly, for a multi-output network structure, only internal memory may be allocated to an output of a parent node, an input of a child node is reduced, and an output of a node is shared, thereby implementing the reuse of internal memory at a connection point, so that the internal memory utilization of the terminal device is increased.

Figure 21:
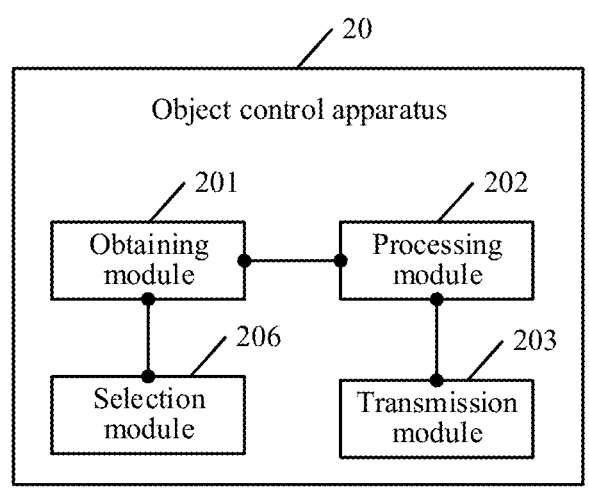
FIG. 21 is a schematic diagram of another embodiment of an object control apparatus according to an embodiment of this application.

In some embodiments, based on the foregoing embodiment corresponding to FIG. 18, referring to FIG. 21, in another embodiment of the object control apparatus 20 provided in this embodiment, the object control apparatus 20 further includes a selection module 206, the obtaining module 201 being further configured to obtain a capacity parameter of the terminal device before the interaction frame data is obtained from the target application according to the object control instruction;

the selection module 206 being configured to select a target matching template from a preset framework matching template set according to an operation parameter obtained by the obtaining module 201, the preset framework matching template set including at least one matching template, each matching template including a parameter used in the data processing framework; and the processing module 202 being specifically configured to process the to-be-processed data according to the target matching template and by using the data processing framework to obtain the interaction control instruction.

Next, in this embodiment, before obtaining the interaction frame data from the target application according to the object control instruction, a target terminal device may further obtain a capacity parameter of the terminal device, and select a target matching template from a preset framework matching template set according to an operation parameter, the preset framework matching template set including at least one matching template, each matching template including a parameter used in the data processing framework. The target terminal device then processes the to-be-processed data according to the target matching template and by using the data processing framework to obtain the interaction control instruction. Accordingly, a user may configure different matching templates in advance. The terminal device selects the most suitable template according to the operation status of the terminal device, and implements the computation of the data processing framework based on the template, thereby implementing the optimal performance configuration of the data processing framework at the terminal device. During the actual operation of AI, the parameter correspondingly configured for the template is directly loaded, to enable the AI to achieve optimal performance.

Figure 22:
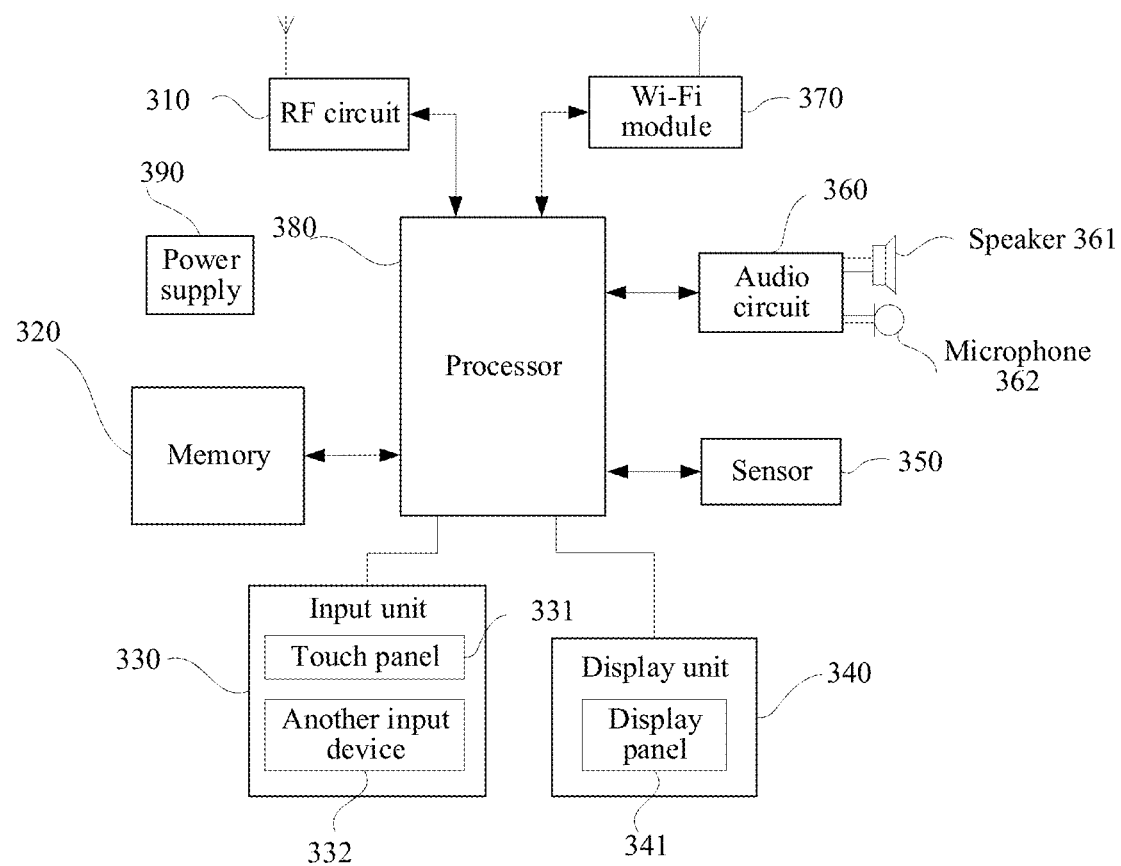
FIG. 22 is a schematic structural diagram of a terminal device according to an embodiment of this application.

This embodiment further provides another image display control apparatus, as shown in FIG. 22. For convenience of description, only parts related to this embodiment are shown. For specific technical details that are not disclosed, refer to the method part of the embodiments of this application. The terminal may be any terminal device including a mobile phone, a tablet computer, a personal digital assistant (PDA), a point of sales (POS), and an on-board computer, and the terminal being a mobile phone is used as an example.

FIG. 22 is a block diagram of the structure of a part of a mobile phone related to a terminal according to an embodiment of this application. Referring to FIG. 22, the mobile phone includes components such as a radio frequency (RF) circuit 310, a memory 320, an input unit 330, a display unit 340, a sensor 350, an audio circuit 360, a wireless fidelity (Wi-Fi) module 370, a processor 380, and a power supply 390. A person skilled in the art may understand that the structure of the mobile phone shown in FIG. 22 does not constitute a limitation on the mobile phone, and the mobile phone may include more components or fewer components than those shown in the figure, or some components may be combined, or a different component deployment may be used.

The following provides a specific description of components of the mobile phone with reference to FIG. 22.

The RF circuit 310 may be configured to receive and send signals during an information receiving and sending process or a call process. Specifically, the RF circuit receives downlink information from a base station, then delivers the downlink information to the processor 380 for processing, and sends designed uplink data to the base station. Usually, the RF circuit 310 includes, but is not limited to, an antenna, at least one amplifier, a transceiver, a coupler, a low noise amplifier (LNA), and a duplexer. In addition, the RF circuit 310 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 320 may be configured to store a software program and module. The processor 380 runs the software program and module stored in the memory 320, to implement various functional applications and data processing of the mobile phone. The memory 320 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 320 may include a high speed random access memory, and may also include a non-volatile memory, such as at least one magnetic disk storage device, a flash memory, or another volatile solid-state storage device.

The input unit 330 may be configured to receive input digit or character information, and generate a keyboard signal input related to the user setting and function control of the mobile phone. Specifically, the input unit 330 may include a touch panel 331 and another input device 332. The touch panel 331, which may also be referred to as a touch screen, may collect a touch operation of a user on or near the touch panel (such as an operation of a user on the touch panel 331 or near the touch panel 331 by using any suitable object or accessory such as a finger or a stylus), and drive a corresponding connection apparatus according to a preset program. In some embodiments, the touch panel 331 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 380. Moreover, the touch controller can receive and execute a command sent from the processor 380. In addition, the touch panel 331 may be implemented by using various types, such as a resistive type, a capacitive type, an infrared type, and a surface acoustic wave type. In addition to the touch panel 331, the input unit 330 may further include another input device 332. Specifically, another input device 332 may include, but is not limited to, one or more of a physical keyboard, a functional key (such as a volume control key or a switch key), a track ball, a mouse, and a joystick.

The display unit 340 may be configured to display information inputted by the user or information provided for the user, and various menus of the mobile phone. The display unit 340 may include a display panel 341. In some embodiments, the display panel 341 may be configured by using a liquid crystal display (LCD), an organic light-emitting diode (OLED), or the like. Further, the touch panel 331 may cover the display panel 341. After detecting a touch operation on or near the touch panel, the touch panel 331 transfers the touch operation to the processor 380, to determine a type of a touch event. Then, the processor 380 provides a corresponding visual output on the display panel 341 according to the type of the touch event. Although in FIG. 22, the touch panel 331 and the display panel 341 are used as two separate parts to implement input and output functions of the mobile phone, in some embodiments, the touch panel 331 and the display panel 341 may be integrated to implement the input and output functions of the mobile phone.

The mobile phone may further include at least one sensor 350 such as an optical sensor, a motion sensor, and other sensors. Specifically, the optical sensor may include an ambient light sensor and a proximity sensor. The ambient light sensor may adjust luminance of the display panel 341 according to brightness of the ambient light. The proximity sensor may switch off the display panel 341 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 360, a loudspeaker 361, and a microphone 362 may provide audio interfaces between a user and the mobile phone. The audio circuit 360 may convert received audio data into an electrical signal and transmit the electrical signal to the speaker 361. The speaker 361 converts the electrical signal into a sound signal for output. On the other hand, the microphone 362 converts a collected sound signal into an electrical signal. The audio circuit 360 receives the electrical signal, converts the electrical signal into audio data, and outputs the audio data to the processor 380 for processing. Then, the processor sends the audio data to, for example, another mobile phone by using the RF circuit 310, or outputs the audio data to the memory 320 for further processing.

Wi-Fi is a short distance wireless transmission technology. The mobile phone may help, by using the Wi-Fi module 370, a user to receive and transmit an email, browse a web page, access stream media, and the like. This provides wireless broadband Internet access for the user.

Although FIG. 22 shows the Wi-Fi module 370, it may be understood that the Wi-Fi module is not a necessary component of the mobile phone, and the Wi-Fi module may be omitted as required provided that the scope of the essence of the present disclosure is not changed.

The processor 380 is a control center of the mobile phone, and is connected to various parts of the entire mobile phone by using various interfaces and lines. By running or executing a software program and/or module stored in the memory 320, and invoking data stored in the memory 320, the processor executes various functions of the mobile phone and performs data processing, thereby monitoring the entire mobile phone. In some embodiments, the processor 380 may include one or more processing units. In some embodiments, the processor 380 may integrate an application processor and a modem processor. The application processor mainly processes an operating system, a user interface, an application program, and the like. The modem processor mainly processes wireless communication. It may be understood that the foregoing modem may not be integrated into the processor 380.

The mobile phone further includes the power supply 390 (such as a battery) for supplying power to the components. In some embodiments, the power supply may be logically connected to the processor 380 by using a power management system, thereby implementing functions such as charging, discharging and power consumption management by using the power management system.

Although not shown in the figure, the mobile phone may further include a camera, a Bluetooth module, and the like, which are not further described herein.

In this embodiment, the processor 380 included in the terminal further has the following functions:

obtaining interaction frame data from a target application according to an object control instruction transmitted by a server in a case that the object control instruction is received, the object control instruction carrying an identifier of a target object;

obtaining to-be-processed data corresponding to the interaction frame data by using an object control model, the object control model being obtained through training by using global interaction data;

processing the to-be-processed data by using a data processing framework to obtain an interaction control instruction, the interaction control instruction carrying the identifier of the target object, the data processing framework being used for implementing sparse convolutional processing of data; and transmitting the interaction control instruction to the server by using the target application, the interaction control instruction being used for instructing the at least one terminal device to control the target object in the target application.

In some embodiments, the processor 380 is specifically configured to perform the following steps:

obtaining first to-be-processed data corresponding to first interaction frame data by using the object control model, the first interaction frame data corresponding to M frames of data in the interaction frame data, M being a positive integer;

obtaining second to-be-processed data corresponding to second interaction frame data by using the object control model, the second interaction frame data corresponding to N frames of data in the interaction frame data, N being a positive integer, N being less than M;

processing the first to-be-processed data by using the data processing framework to obtain a first interaction control instruction; and processing the second to-be-processed data by using the data processing framework to obtain a second interaction control instruction.

In some embodiments, the processor 380 is further configured to perform the following steps:

extracting operation eigen-information according to the to-be-processed data, the operation eigen-information including a first eigenelement set and a second eigenelement set, a quantity of elements in the first eigenelement set being less than a quantity of elements in the second eigenelement set; and obtaining the first eigenelement set from the operation eigen-information; and the processor 380 is specifically configured to perform the following steps:

generating a depth map according to the first eigenelement set, the depth map including a plurality of boundary elements and a plurality of internal elements;

for each boundary element in the plurality of boundary elements, performing convolutional computation by using three adjacent elements, or, performing convolutional computation by using five adjacent elements, to obtain a first convolutional result;

for each internal element in the plurality of internal elements, performing convolutional computation by using eight adjacent elements, to obtain a second convolutional result;

generating a target convolutional result according to the first convolutional result and the second convolutional result; and generating an interaction control instruction according to the target convolutional result.

In some embodiments, the processor 380 is further configured to perform the following step:

operating the data processing framework by using an ARM-based instruction set.

In some embodiments, the processor 380 is specifically configured to perform the following steps:

processing the to-be-processed data in a register by using the data processing framework to obtain to-be-fused data; and processing the to-be-fused data in internal memory by using the data processing framework.

In some embodiments, the processor 380 is specifically configured to perform the following step:

processing the to-be-processed data in the register by using a pooling layer and a conv layer, the pooling layer being used for regularizing and pooling the to-be-processed data, the conv layer being used for activating and normalizing the to-be-processed data.

In some embodiments, the processor 380 is specifically configured to perform the following step:

processing the to-be-fused data in the internal memory by using an FC layer, the to-be-fused data including first to-be-fused data and second to-be-fused data, the FC layer being used for concatenating the first to-be-fused data and the second to-be-fused data, and fusing the first to-be-fused data and the second to-be-fused data.

In some embodiments, in this embodiment the processor 380 is specifically configured to perform the following steps:

obtaining to-be-processed data from first internal memory;

performing convolutional processing on the to-be-processed data to obtain a convolutional processing result, the convolutional processing result being stored in second internal memory, the second internal memory and the first internal memory being two different pieces of preallocated internal memory;

obtaining the convolutional processing result from the second internal memory; and performing data fusion on the convolutional processing result to obtain a fusion result, the fusion result being stored in the first internal memory.

In some embodiments, the processor 380 is specifically configured to perform the following steps:

performing convolutional processing on the to-be-processed data to obtain a convolutional processing result, the convolutional processing result being stored in a target internal memory;

performing data fusion on the to-be-processed data to obtain a first fusion result, the first fusion result being stored in the target internal memory;

obtaining the convolutional processing result and the first fusion result from the target internal memory; and performing data fusion on the convolutional processing result and the first fusion result to obtain a second fusion result.

In some embodiments, the processor 380 is specifically configured to perform the following steps:

obtaining a first convolutional processing result from the target internal memory; and fusing the first convolutional processing result to obtain a fusion result, and/or, performing convolutional processing on the first convolutional processing result to obtain a second convolutional processing result.

In some embodiments, the processor 380 is further configured to perform the following steps:

obtaining a capacity parameter of the terminal device; and selecting a target matching template from a preset framework matching template set according to an operation parameter, the preset framework matching template set including at least one matching template, each matching template including a parameter used in the data processing framework; and the processing the to-be-processed data by using a data processing framework to obtain an interaction control instruction includes:

processing the to-be-processed data according to the target matching template and by using the data processing framework to obtain the interaction control instruction.

Persons skilled in the art may clearly understand that, for the purpose of convenient and brief description, for a detailed working process of the system, apparatus, and unit described above, refer to a corresponding process in the method embodiments, and details are not described herein again.

In the embodiments of this application, the disclosed system, apparatus, and method may be implemented in other manners. For example, the described apparatus embodiment is merely an example. For example, the unit division or a module is merely logical function division and may be other division during actual implementation. For example, a plurality of units/modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units/modules described as separate components may or may not be physically separated, and the components displayed as units/modules may or may not be physical units, and may be located in one place or may be distributed over multiple network units. Some or all of the units/modules may be selected according to actual needs to achieve the objectives of the solutions of the embodiments.

In addition, functional units/modules in the embodiments of this application may be integrated into one processing unit, or each of the units may be physically separated, or two or more units/modules may be integrated into one unit/module. The integrated unit/module may be implemented in the form of hardware, or may be implemented in a form of a software functional unit/module.

When the integrated unit/module is implemented in the form of a software functional unit/module and sold or used as an independent product, the integrated unit may be stored in a computer-readable storage medium. All or a part of the technical solutions may be implemented in the form of a software product. The computer software unit/module may be stored in a storage medium and includes several instructions for instructing a computer device (which may be a PC, a server or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random access memory (RAM), a magnetic disk or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for controlling a target object, applicable to a terminal device, and comprising:

receiving an object control instruction, and obtaining interaction frame data from a target application according to the object control instruction, the object control instruction carrying an identifier of a target object;

obtaining to-be-processed data corresponding to the interaction frame data through an object control model;

processing the to-be-processed data using a data processing framework to obtain an interaction control instruction, the interaction control instruction carrying the identifier of the target object, the data processing framework implementing sparse convolutional processing of data; and transmitting the interaction control instruction through the target application, the interaction control instruction instructing at least one terminal device to control the target object in the target application.

2. The method according to claim 1, wherein the obtaining to-be-processed data corresponding to the interaction frame data through an object control model comprises:

obtaining first to-be-processed data corresponding to first interaction frame data using the object control model, the first interaction frame data corresponding to M frames of data in the interaction frame data, M being a positive integer; and obtaining second to-be-processed data corresponding to second interaction frame data using the object control model, the second interaction frame data corresponding to N frames of data in the interaction frame data, N being a positive integer, N being less than M; and the processing the to-be-processed data using a data processing framework to obtain an interaction control instruction comprises:

processing the first to-be-processed data using the data processing framework to obtain a first interaction control instruction; and processing the second to-be-processed data using the data processing framework to obtain a second interaction control instruction.

3. The method according to claim 1, wherein after the obtaining to-be-processed data corresponding to the interaction frame data through an object control model, the method further comprises:

extracting operation eigen-information according to the to-be-processed data, the operation eigen-information comprising a first eigenelement set and a second eigenelement set, a quantity of elements in the first eigenelement set being less than a quantity of elements in the second eigenelement set; and obtaining the first eigenelement set from the operation eigen-information; and the processing the to-be-processed data using a data processing framework to obtain an interaction control instruction comprises:
generating a depth map according to the first eigenelement set, the depth map comprising a plurality of boundary elements and a plurality of internal elements;
for each boundary element in the plurality of boundary elements, performing convolutional computation using three adjacent elements, or using five adjacent elements, to obtain a first convolutional result;
for each internal element in the plurality of internal elements, performing convolutional computation using eight adjacent elements, to obtain a second convolutional result;
generating a target convolutional result according to the first convolutional result and the second convolutional result; and
generating an interaction control instruction according to the target convolutional result.

4. The method according to claim 1, wherein before the processing the to-be-processed data using a data processing framework to obtain an interaction control instruction, the method further comprises:
operating the data processing framework using an ARM-based instruction set.

5. The method according to claim 1, wherein the processing the to-be-processed data using a data processing framework comprises:
processing the to-be-processed data in a register using the data processing framework to obtain to-be-fused data; and
processing the to-be-fused data in internal memory using the data processing framework.

6. The method according to claim 5, wherein the processing the to-be-processed data in a register using the data processing framework to obtain to-be-fused data comprises:
processing the to-be-processed data in the register using a pooling layer and a convolutional (conv) layer, the pooling layer regularizing and pooling the to-be-processed data, the conv layer activating and normalizing the to-be-processed data.

7. The method according to claim 5, wherein the processing the to-be-fused data in internal memory using the data processing framework comprises:
processing the to-be-fused data in the internal memory using a fully connected (FC) layer, the to-be-fused data comprising first to-be-fused data and second to-be-fused data, the FC layer concatenating the first to-be-fused data and the second to-be-fused data, and fusing the first to-be-fused data and the second to-be-fused data.

8. The method according to claim 1, wherein the processing the to-be-processed data by using a data processing framework comprises:
obtaining to-be-processed data from first internal memory;
performing convolutional processing on the to-be-processed data to obtain a convolutional processing result, the convolutional processing result being stored in second internal memory, the second internal memory and the first internal memory being two different pieces of preallocated internal memory;
obtaining the convolutional processing result from the second internal memory; and
performing data fusion on the convolutional processing result to obtain a fusion result, the fusion result being stored in the first internal memory.

9. The method according to claim 1, wherein the processing the to-be-processed data using a data processing framework comprises:
performing convolutional processing on the to-be-processed data to obtain a convolutional processing result, the convolutional processing result being stored in a target internal memory;
performing data fusion on the to-be-processed data to obtain a first fusion result, the first fusion result being stored in the target internal memory;
obtaining the convolutional processing result and the first fusion result from the target internal memory; and
performing data fusion on the convolutional processing result and the first fusion result to obtain a second fusion result.

10. The method according to claim 1, wherein the processing the to-be-processed data using a data processing framework comprises:
performing convolutional processing on the to-be-processed data to obtain a convolutional processing result, the convolutional processing result being stored in a target internal memory;
obtaining a first convolutional processing result from the target internal memory; and
fusing the first convolutional processing result to obtain a fusion result, and/or, performing convolutional processing on the first convolutional processing result to obtain a second convolutional processing result.

11. The method according to claim 1, wherein before the obtaining interaction frame data from a target application according to the object control instruction, the method further comprises:
obtaining a capacity parameter of the terminal device; and
selecting a target matching template from a preset framework matching template set according to an operation parameter, the preset framework matching template set comprising at least one matching template, each matching template comprising a parameter of the data processing framework; and
the processing the to-be-processed data using a data processing framework to obtain an interaction control instruction comprises:
processing the to-be-processed data according to the target matching template and using the data processing framework to obtain the interaction control instruction.

12. A terminal device, comprising: a memory, a transceiver, a processor, and a bus system,
the memory being configured to store a program; and
the processor being configured to execute the program in the memory to perform the following operations:
receiving an object control instruction transmitted, and obtaining interaction frame data from a target application according to the object control instruction, the object control instruction carrying an identifier of a target object;
obtaining to-be-processed data corresponding to the interaction frame data through an object control model;
processing the to-be-processed data using a data processing framework to obtain an interaction control instruction, the interaction control instruction carrying the identifier of the target object, the data processing framework implementing sparse convolutional processing of data; and
transmitting the interaction control instruction using the target application, the interaction control instruction instructing at least one terminal device to control the target object in the target application; and the bus system being configured to connect the memory and the processor to enable the memory and the processor to perform communication.

13. The terminal device according to claim 12, wherein the obtaining to-be-processed data corresponding to the interaction frame data through an object control model comprises:
obtaining first to-be-processed data corresponding to first interaction frame data using the object control model, the first interaction frame data corresponding to M frames of data in the interaction frame data, M being a positive integer; and
obtaining second to-be-processed data corresponding to second interaction frame data using the object control model, the second interaction frame data corresponding to N frames of data in the interaction frame data, N being a positive integer, N being less than M; and
the processing the to-be-processed data using a data processing framework to obtain an interaction control instruction comprises:
processing the first to-be-processed data using the data processing framework to obtain a first interaction control instruction; and
processing the second to-be-processed data using the data processing framework to obtain a second interaction control instruction.

14. The terminal device according to claim 12, wherein after the obtaining to-be-processed data corresponding to the interaction frame data through an object control model, the method further comprises:
extracting operation eigen-information according to the to-be-processed data, the operation eigen-information comprising a first eigenelement set and a second eigenelement set, a quantity of elements in the first eigenelement set being less than a quantity of elements in the second eigenelement set; and
obtaining the first eigenelement set from the operation eigen-information; and
the processing the to-be-processed data using a data processing framework to obtain an interaction control instruction comprises:
generating a depth map according to the first eigenelement set, the depth map comprising a plurality of boundary elements and a plurality of internal elements;
for each boundary element in the plurality of boundary elements, performing convolutional computation using three adjacent elements, or using five adjacent elements, to obtain a first convolutional result;
for each internal element in the plurality of internal elements, performing convolutional computation using eight adjacent elements, to obtain a second convolutional result;
generating a target convolutional result according to the first convolutional result and the second convolutional result; and
generating an interaction control instruction according to the target convolutional result.

15. The terminal device according to claim 12, wherein before the processing the to-be-processed data using a data processing framework to obtain an interaction control instruction, the method further comprises:
operating the data processing framework using an ARM-based instruction set.

16. The terminal device according to claim 12, wherein the processing the to-be-processed data using a data processing framework comprises:
processing the to-be-processed data in a register using the data processing framework to obtain to-be-fused data; and
processing the to-be-fused data in internal memory using the data processing framework.

17. The terminal device according to claim 12, wherein the processing the to-be-processed data in a register using the data processing framework to obtain to-be-fused data comprises:
processing the to-be-processed data in the register using a pooling layer and a convolutional (conv) layer, the pooling layer regularizing and pooling the to-be-processed data, the conv layer activating and normalizing the to-be-processed data.

18. The terminal device according to claim 12, wherein the processing the to-be-fused data in internal memory using the data processing framework comprises:
processing the to-be-fused data in the internal memory using a fully connected (FC) layer, the to-be-fused data comprising first to-be-fused data and second to-be-fused data, the FC layer concatenating the first to-be-fused data and the second to-be-fused data, and fusing the first to-be-fused data and the second to-be-fused data.

19. The terminal device according to claim 12, wherein the processing the to-be-processed data by using a data processing framework comprises:
obtaining to-be-processed data from first internal memory;
performing convolutional processing on the to-be-processed data to obtain a convolutional processing result, the convolutional processing result being stored in second internal memory, the second internal memory and the first internal memory being two different pieces of preallocated internal memory;
obtaining the convolutional processing result from the second internal memory; and
performing data fusion on the convolutional processing result to obtain a fusion result, the fusion result being stored in the first internal memory.

20. A non-transitory computer-readable storage medium, the computer-readable storage medium storing a program, the program, when run on a processor, causing the processor to perform a plurality of operations comprising:
receiving an object control instruction, and obtaining interaction frame data from a target application according to the object control instruction, the object control instruction carrying an identifier of a target object;
obtaining to-be-processed data corresponding to the interaction frame data through an object control model;
processing the to-be-processed data using a data processing framework to obtain an interaction control instruction, the interaction control instruction carrying the identifier of the target object, the data processing framework implementing sparse convolutional processing of data; and
transmitting the interaction control instruction through the target application, the interaction control instruction instructing at least one terminal device to control the target object in the target application.

* * * * *